US007258707B2

(12) United States Patent
Celikkaya et al.

(10) Patent No.: US 7,258,707 B2
(45) Date of Patent: *Aug. 21, 2007

(54) $Al_2O_3$-$LA_2O_3$-$Y_2O_3$-MGO CERAMICS, AND METHODS OF MAKING THE SAME

(75) Inventors: Ahmet Celikkaya, Woodbury, MN (US); Thomas J. Anderson, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 23 days.

This patent is subject to a terminal disclaimer.

(21) Appl. No.: 10/358,855

(22) Filed: Feb. 5, 2003

(65) Prior Publication Data

US 2004/0148870 A1 Aug. 5, 2004

(51) Int. Cl.
*B24D 3/00* (2006.01)
*C09K 3/14* (2006.01)
*C03C 10/00* (2006.01)
(52) U.S. Cl. ............... 51/307; 51/309; 51/298; 51/295; 501/127; 501/128; 501/2; 501/32
(58) Field of Classification Search ............ 51/298, 51/307, 309, 295, 308; 501/127, 128, 2, 501/32, 153
See application file for complete search history.

(56) References Cited

U.S. PATENT DOCUMENTS

| | | | |
|---|---|---|---|
| 659,926 A | 10/1900 | Jacobs | |
| 906,339 A | 12/1908 | Tone | |
| 960,712 A | 6/1910 | Saunders | |
| 1,037,999 A | 9/1912 | Saunders | |
| 1,107,011 A | 8/1914 | Allen | |
| 1,149,064 A | 8/1915 | Kalmus | |
| 1,161,620 A | 11/1915 | Coulter | |
| 1,192,709 A | 7/1916 | Tone | |
| 1,240,490 A | 9/1917 | Saunders et al. | |
| 1,247,337 A | 11/1917 | Saunders et al. | |
| 1,257,356 A | 2/1918 | Hutchins | |
| 1,263,708 A | 4/1918 | Saunders et al. | |
| 1,263,709 A | 4/1918 | Saunders et al. | |
| 1,263,710 A | 4/1918 | Saunders et al. | |
| 1,268,532 A | 6/1918 | Allen | |
| 1,268,533 A | 6/1918 | Allen | |
| 1,314,061 A | 8/1919 | Harrison | |
| 1,339,344 A | 5/1920 | Hutchins | |
| 1,402,714 A | 1/1922 | Brockbank | |
| 1,448,586 A | 3/1923 | Allen | |
| 1,910,444 A | 5/1933 | Nicholson | |
| 2,000,857 A | 5/1935 | Masin | |
| 2,206,081 A | 7/1940 | Eberlin | |
| 2,424,645 A | 7/1947 | Baumann, Jr. et al. | |
| 2,618,567 A | 11/1952 | Comstock, III | |
| 2,805,166 A | 9/1957 | Loffler | |
| 2,958,593 A | 11/1960 | Hoover et al. | |
| 2,961,296 A | 11/1960 | Fenerty | |
| 3,041,156 A | 6/1962 | Rowse et al. | |
| 3,141,747 A | 7/1964 | Marshall | |
| 3,174,871 A | 3/1965 | Geffcken et al. | |
| 3,181,939 A | 5/1965 | Marshall et al. | |
| 3,216,794 A | 11/1965 | Roschuk | |
| 3,377,660 A | 4/1968 | Marshall et al. | |
| 3,498,769 A | 3/1970 | Coes, Jr. | |
| 3,625,717 A | 12/1971 | Grubba et al. | |
| 3,635,739 A | 1/1972 | Macdowell et al. | |
| 3,637,361 A | 1/1972 | Kita et al. | |
| 3,646,713 A | 3/1972 | Marshall et al. | |
| 3,650,780 A | 3/1972 | Connelly | |
| 3,726,621 A | 4/1973 | Cichy | |
| 3,754,978 A | 8/1973 | Elmer et al. | |
| 3,781,172 A | 12/1973 | Pett et al. | |
| 3,792,553 A | 2/1974 | Schleifer et al. | |
| 3,859,407 A | 1/1975 | Blanding et al. | |
| 3,881,282 A | 5/1975 | Watson | |
| 3,891,408 A | 6/1975 | Rowse et al. | |
| 3,893,826 A | 7/1975 | Quinan et al. | |
| 3,916,584 A | 11/1975 | Howard et al. | |
| 3,926,603 A | 12/1975 | Plesslinger et al. | |

(Continued)

FOREIGN PATENT DOCUMENTS

| AT | 333146 | 10/1976 |
|---|---|---|
| DE | 20 34 011 | 7/1970 |
| DE | 134 638 A | 3/1979 |
| DE | 141 420 | 4/1980 |
| EP | 0 200 487 | 11/1986 |

(Continued)

OTHER PUBLICATIONS

Kondrashov V I et al., "Opacified Glass "Decorit" Synthesis Directions", Steklo I Keramika 2001, No. 1, pp. 8-11, no month.
"$Gd_3Al_5O_{12}$ Phase Obtained by Crystallization of Amorphous $Gd_2O_3$ ⅗ $Al_2O_3$," Shishido et al., *Journal of the American Ceramic Society*, vol. 61, No. 7-8, Jul.-Aug. 1978, pp. 373-374.
"Rapid Quenching on the Binary Systems of High Temperature Oxides," Suzuki et al., *Mat. Res. Bull.*, vol. 9, 1974, pp. 745-754, no month.

(Continued)

*Primary Examiner*—Michael Marcheschi
(74) *Attorney, Agent, or Firm*—Gregory D. Allen

(57) ABSTRACT

$Al_2O_3$—$La_2O_3$—$Y_2O_3$—MgO ceramics (including glasses, crystalline ceramics, and glass-ceramics) and methods of making the same. Ceramics according to the present invention can be made, formed as, or converted into glass beads, articles (e.g., plates), fibers, particles, and thin coatings. The particles and fibers are useful, for example, as thermal insulation, filler, or reinforcing material in composites (e.g., ceramic, metal, or polymeric matrix composites). The thin coatings can be useful, for example, as protective coatings in applications involving wear, as well as for thermal management. Some embodiments of ceramic particles according to the present invention can be are particularly useful as abrasive particles.

47 Claims, 3 Drawing Sheets

U.S. PATENT DOCUMENTS

| | | |
|---|---|---|
| 3,928,515 A | 12/1975 | Richmond et al. |
| 3,940,276 A | 2/1976 | Wilson |
| 3,947,281 A | 3/1976 | Bacon |
| 3,973,977 A | 8/1976 | Wilson |
| 3,996,702 A | 12/1976 | Leahy |
| 4,014,122 A | 3/1977 | Woods |
| 4,035,162 A | 7/1977 | Brothers et al. |
| 4,049,397 A | 9/1977 | Bockstiegel et al. |
| 4,059,417 A | 11/1977 | Ilmaier et al. |
| 4,070,796 A | 1/1978 | Scott |
| 4,073,096 A | 2/1978 | Ueltz et al. |
| 4,111,668 A | 9/1978 | Walker et al. |
| 4,111,707 A | 9/1978 | Komorita et al. |
| 4,126,429 A | 11/1978 | Watson |
| 4,140,494 A | 2/1979 | Coes, Jr. |
| 4,157,898 A | 6/1979 | Walker et al. |
| 4,182,437 A | 1/1980 | Roberts et al. |
| 4,194,887 A | 3/1980 | Ueltz et al. |
| 4,217,264 A | 8/1980 | Mabie et al. |
| 4,218,253 A | 8/1980 | Dworak et al. |
| 4,238,213 A | 12/1980 | Pallo et al. |
| 4,261,706 A | 4/1981 | Blanding et al. |
| 4,311,489 A | 1/1982 | Kressner |
| 4,314,827 A | 2/1982 | Leitheiser et al. |
| 4,316,964 A | 2/1982 | Lange |
| 4,341,533 A | 7/1982 | Daire et al. |
| RE31,128 E | 1/1983 | Walker et al. |
| 4,405,545 A | 9/1983 | Septier et al. |
| 4,415,510 A | 11/1983 | Richmond |
| 4,439,845 A | 3/1984 | Geohegan, Jr. et al. |
| 4,457,767 A | 7/1984 | Poon et al. |
| 4,467,767 A | 8/1984 | Kampichler et al. |
| 4,472,511 A | 9/1984 | Mennemann et al. |
| RE31,725 E | 11/1984 | Walker et al. |
| 4,489,022 A | 12/1984 | Robyn et al. |
| 4,518,397 A | 5/1985 | Leitheiser et al. |
| 4,530,909 A | 7/1985 | Makishima et al. |
| 4,543,107 A | 9/1985 | Rue |
| 4,552,199 A | 11/1985 | Onoyama et al. |
| 4,584,279 A | 4/1986 | Grabowski et al. |
| 4,588,419 A | 5/1986 | Caul et al. |
| 4,595,663 A | 6/1986 | Krohn et al. |
| 4,623,364 A | 11/1986 | Cottringer et al. |
| 4,652,275 A | 3/1987 | Bloecher et al. |
| 4,705,656 A | 11/1987 | Onoyama et al. |
| 4,734,104 A | 3/1988 | Broberg |
| 4,737,163 A | 4/1988 | Larkey |
| 4,741,743 A | 5/1988 | Narayanan et al. |
| 4,744,802 A | 5/1988 | Schwabel |
| 4,751,137 A | 6/1988 | Halg et al. |
| 4,752,459 A | 6/1988 | Pepper |
| 4,756,746 A | 7/1988 | Kemp, Jr. et al. |
| 4,757,036 A | 7/1988 | Kaar et al. |
| 4,762,677 A | 8/1988 | Dolgin |
| 4,770,671 A | 9/1988 | Monroe et al. |
| 4,772,511 A | 9/1988 | Wood et al. |
| 4,780,268 A | 10/1988 | Papsi et al. |
| 4,789,501 A | 12/1988 | Day et al. |
| 4,799,939 A | 1/1989 | Bloecher et al. |
| 4,800,685 A | 1/1989 | Haynes, Jr. |
| 4,812,422 A | 3/1989 | Yuhaku et al. |
| 4,829,031 A | 5/1989 | Roy et al. |
| 4,881,951 A | 11/1989 | Monroe et al. |
| 4,898,587 A | 2/1990 | Mera |
| 4,898,597 A | 2/1990 | Hay et al. |
| 4,950,294 A | 8/1990 | Hakamatsuka |
| 4,960,441 A | 10/1990 | Pellow et al. |
| 4,997,461 A | 3/1991 | Markhof-Matheny et al. |
| 5,007,943 A | 4/1991 | Kelly et al. |
| 5,009,675 A | 4/1991 | Kunz et al. |
| 5,009,676 A | 4/1991 | Rue et al. |
| 5,011,508 A | 4/1991 | Wald et al. |
| 5,013,696 A | 5/1991 | Greskovich et al. |
| 5,023,212 A | 6/1991 | Dubots et al. |
| 5,038,453 A | 8/1991 | Kurita et al. |
| 5,042,991 A | 8/1991 | Kunz et al. |
| 5,045,402 A | 9/1991 | Adams, Jr. et al. |
| 5,057,018 A | 10/1991 | Bowen |
| 5,071,801 A | 12/1991 | Bedard et al. |
| 5,085,671 A | 2/1992 | Martin et al. |
| 5,090,968 A | 2/1992 | Pellow |
| 5,094,672 A | 3/1992 | Giles, Jr. et al. |
| 5,104,319 A | 4/1992 | Evans et al. |
| 5,110,332 A | 5/1992 | Isaksson |
| 5,118,326 A | 6/1992 | Lee et al. |
| 5,122,176 A | 6/1992 | Goettler |
| 5,131,926 A | 7/1992 | Rostoker et al. |
| 5,139,978 A | 8/1992 | Wood |
| 5,143,522 A | 9/1992 | Gibson et al. |
| 5,152,917 A | 10/1992 | Pieper et al. |
| 5,164,348 A | 11/1992 | Wood |
| 5,185,299 A | 2/1993 | Wood et al. |
| 5,194,072 A | 3/1993 | Rue et al. |
| 5,201,916 A | 4/1993 | Berg et al. |
| 5,203,884 A | 4/1993 | Buchanan et al. |
| 5,203,886 A | 4/1993 | Sheldon et al. |
| 5,213,591 A | 5/1993 | Celikkaya et al. |
| 5,215,563 A | 6/1993 | LaCourse et al. |
| 5,227,104 A | 7/1993 | Bauer |
| 5,248,318 A | 9/1993 | Tamamaki et al. |
| 5,259,147 A | 11/1993 | Falz et al. |
| 5,273,566 A | 12/1993 | Balcar et al. |
| 5,282,875 A | 2/1994 | Wood et al. |
| 5,312,789 A | 5/1994 | Wood |
| 5,336,280 A | 8/1994 | Dubots et al. |
| 5,352,254 A | 10/1994 | Celikkaya |
| 5,366,523 A | 11/1994 | Rowenhorst et al. |
| 5,372,620 A | 12/1994 | Rowse et al. |
| 5,376,470 A | 12/1994 | Sprouse |
| 5,378,251 A | 1/1995 | Culler et al. |
| 5,378,662 A | 1/1995 | Tsuyuki |
| 5,395,407 A | 3/1995 | Cottringer et al. |
| 5,395,407 A | 3/1995 | Cottringer et al. |
| 5,413,974 A | 5/1995 | Yokoyama et al. |
| 5,417,726 A | 5/1995 | Stout et al. |
| 5,427,595 A | 6/1995 | Pihl et al. |
| 5,429,647 A | 7/1995 | Larmie |
| 5,431,704 A | 7/1995 | Tamamaki et al. |
| 5,436,063 A | 7/1995 | Follett et al. |
| 5,443,906 A | 8/1995 | Pihl et al. |
| 5,449,389 A | 9/1995 | Yoshizumi et al. |
| 5,484,752 A | 1/1996 | Waku et al. |
| 5,496,386 A | 3/1996 | Broberg et al. |
| 5,498,269 A | 3/1996 | Larmie |
| 5,516,348 A | 5/1996 | Conwell et al. |
| 5,520,711 A | 5/1996 | Helmin |
| 5,534,843 A | 7/1996 | Tsunoda et al. |
| 5,547,479 A | 8/1996 | Conwell et al. |
| 5,549,962 A | 8/1996 | Holmes et al. |
| 5,551,963 A | 9/1996 | Larmie |
| 5,552,213 A | 9/1996 | Eschner |
| 5,569,547 A | 10/1996 | Waku et al. |
| 5,593,467 A | 1/1997 | Monroe |
| 5,605,870 A | 2/1997 | Strom-Olsen et al. |
| 5,609,706 A | 3/1997 | Benedict et al. |
| 5,611,829 A | 3/1997 | Monroe et al. |
| 5,641,469 A | 6/1997 | Garg et al. |
| 5,645,619 A | 7/1997 | Erickson et al. |
| 5,651,925 A | 7/1997 | Ashley et al. |
| 5,653,775 A * | 8/1997 | Plovnick et al. ............... 51/309 |
| 5,665,127 A | 9/1997 | Moltgen et al. |
| 5,679,067 A | 10/1997 | Johnson et al. |
| 5,682,082 A | 10/1997 | Wei et al. |
| 5,693,239 A | 12/1997 | Wang et al. |

| | | |
|---|---|---|
| 5,721,188 A | 2/1998 | Sung et al. |
| 5,725,162 A | 3/1998 | Garg et al. |
| 5,733,178 A | 3/1998 | Obishi |
| 5,733,564 A | 3/1998 | Lehtinen |
| 5,738,696 A | 4/1998 | Wu |
| 5,747,397 A | 5/1998 | McPherson et al. |
| 5,763,345 A | 6/1998 | Ohshima et al. |
| 5,782,940 A | 7/1998 | Jayan et al. |
| 5,804,513 A | 9/1998 | Sakatani et al. |
| 5,847,865 A | 12/1998 | Gopinath et al. |
| 5,856,254 A | 1/1999 | Feige et al. |
| 5,863,308 A | 1/1999 | Qi et al. |
| 5,876,470 A | 3/1999 | Abrahamson |
| 5,902,763 A | 5/1999 | Waku et al. |
| 5,903,951 A | 5/1999 | Ionta et al. |
| 5,952,256 A | 9/1999 | Morishita et al. |
| 5,954,844 A | 9/1999 | Law et al. |
| 5,961,674 A | 10/1999 | Gagliardi et al. |
| 5,975,988 A | 11/1999 | Christianson |
| 5,976,274 A | 11/1999 | Inoue et al. |
| 5,981,413 A | 11/1999 | Hale |
| 5,981,415 A | 11/1999 | Waku et al. |
| 6,053,956 A | 4/2000 | Wood |
| 6,054,093 A | 4/2000 | Torre, Jr. et al. |
| 6,123,743 A | 9/2000 | Carman et al. |
| 6,128,430 A | 10/2000 | Chu et al. |
| 6,146,244 A | 11/2000 | Atsugi et al. |
| 6,214,429 B1 | 4/2001 | Zou et al. |
| 6,245,700 B1 | 6/2001 | Budd et al. |
| 6,251,813 B1 | 6/2001 | Sato |
| 6,254,981 B1 | 7/2001 | Castle |
| 6,268,303 B1 | 7/2001 | Aitken et al. |
| 6,277,161 B1 | 8/2001 | Castro et al. |
| 6,287,353 B1 | 9/2001 | Celikkaya |
| 6,306,926 B1 | 10/2001 | Bretscher et al. |
| 6,335,083 B1 | 1/2002 | Kasai et al. |
| 6,361,414 B1 | 3/2002 | Ravkin et al. |
| 6,362,119 B1 | 3/2002 | Chiba |
| 6,447,937 B1 | 9/2002 | Murakawa et al. |
| 6,451,077 B1 | 9/2002 | Rosenflanz |
| 6,454,822 B1 | 9/2002 | Rosenflanz |
| 6,458,731 B1 | 10/2002 | Rosenflanz |
| 6,461,988 B2 | 10/2002 | Budd et al. |
| 6,469,825 B1 | 10/2002 | Digonnet et al. |
| 6,482,758 B1 | 11/2002 | Weber et al. |
| 6,482,761 B1 | 11/2002 | Watanabe et al. |
| 6,484,539 B1 | 11/2002 | Nordine et al. |
| 6,490,081 B1 | 12/2002 | Feillens et al. |
| 6,511,739 B2 | 1/2003 | Kasai et al. |
| 6,514,892 B1 | 2/2003 | Kasai et al. |
| 6,521,004 B1 | 2/2003 | Culler et al. |
| 6,620,214 B2 | 9/2003 | McArdle et al. |
| 6,749,653 B2 | 6/2004 | Castro et al. |
| 6,818,578 B2 | 11/2004 | Tachiwama |
| 2001/0030811 A1 | 10/2001 | Kasai et al. |
| 2002/0066233 A1 | 6/2002 | McArdle et al. |
| 2002/0160694 A1 | 10/2002 | Wood et al. |
| 2003/0040423 A1 | 2/2003 | Harada et al. |
| 2003/0110706 A1 | 6/2003 | Rosenflanz |
| 2003/0110708 A1* | 6/2003 | Rosenflanz ................. 51/307 |
| 2003/0145525 A1* | 8/2003 | Rosenflanz ................. 51/307 |
| 2004/0148868 A1 | 8/2004 | Anderson et al. |

FOREIGN PATENT DOCUMENTS

| | | |
|---|---|---|
| EP | 0 227 374 | 7/1987 |
| EP | 0 236 507 | 9/1987 |
| EP | 0 291 029 A1 | 11/1988 |
| EP | 0 408 771 A1 | 1/1991 |
| EP | 0 469 271 | 2/1992 |
| EP | 0 480 678 A1 | 4/1992 |
| EP | 0 494 638 | 7/1992 |
| EP | 0 495 536 A2 | 7/1992 |
| EP | 0 579 281 A1 | 1/1994 |
| EP | 0 601 453 A2 | 6/1994 |
| EP | 0 647 601 A1 | 4/1995 |
| EP | 0 666 238 B1 | 8/1995 |
| EP | 0 666 239 B1 | 8/1995 |
| EP | 0 709 347 | 5/1996 |
| EP | 0 722 919 A1 | 7/1996 |
| EP | 0 291 029 B2 | 11/1996 |
| FR | 1547989 | 10/1968 |
| FR | 2 118 026 | 7/1972 |
| FR | 2538370 | 6/1984 |
| FR | 2609708 | 7/1988 |
| GB | 793503 | 4/1958 |
| GB | 1005338 | 9/1965 |
| GB | 1 121 875 | 7/1968 |
| GB | 1 260 933 A | 1/1972 |
| GB | 2 116 992 | 10/1983 |
| GB | 2 377 438 A | 1/2003 |
| JP | 59 22 7726 A | 12/1984 |
| JP | 60221338 | 11/1985 |
| JP | 61099665 | 5/1986 |
| JP | 62-003041 | 1/1987 |
| JP | 63-156024 | 6/1988 |
| JP | 63-303821 | 12/1988 |
| JP | 03-113428 A | 5/1991 |
| JP | 4-119941 | 4/1992 |
| JP | 04119941 A * | 4/1992 |
| JP | 05-085821 | 4/1993 |
| JP | 05-226733 A | 9/1993 |
| JP | 06 040765 A | 2/1994 |
| JP | 06-171974 | 6/1994 |
| JP | 11-189926 | 7/1999 |
| JP | 200045128 A | 2/2000 |
| JP | 200045129 A | 2/2000 |
| JP | 201294480 | 10/2001 |
| KR | 9601009 B1 | 1/1996 |
| SU | 1455569 | 10/1986 |
| SU | 1455569 | 10/1996 |
| WO | WO94/14722 | 7/1994 |
| WO | WO97/16385 | 5/1997 |
| WO | WO97/25284 | 7/1997 |
| WO | WO 00/34201 | 6/2000 |
| WO | WO 01/16047 A2 | 3/2001 |
| WO | WO 01/23321 A1 | 4/2001 |
| WO | WO 01/23323 A1 | 4/2001 |
| WO | WO 01/27046 A1 | 4/2001 |
| WO | WO 01/56946 A | 8/2001 |
| WO | WO 01/56947 A | 8/2001 |
| WO | WO 01/56949 A | 8/2001 |
| WO | WO 01/56950 A | 8/2001 |
| WO | WO 02/08146 A | 1/2002 |

OTHER PUBLICATIONS

"Unusual Glass Formation in the Al-Nd-O System," Yajima et al., Chemistry Letters (published by the Chemical Society of Japan), 1973, pp. 741-742, no month.

Glass Formation in the Ln-Al-O System, (Ln: Lanthanoid and Yttrium Elements), Yajima et al., Chemistry Letters, 1973, pp. 1327-1330, no month.

"Production and Studies of Alumina Based Refractory Glass," Coutures et al., Mat. Res. Bull., vol. 10, No. 6, 1975, pp. 539-546, no month.

"Net Optical Gain at 1.53 μm in Er-Doped $Al_2O_3$ Waveguides on Silicon," van den Hoven et al., Appl. Phys. Lett. 68 (14), Apr. 1, 1966, pp. 1886-1888.

"Rare Earth Oxide-Aluminum Oxide Glasses for Mid-Range IR Devices," Weber et al., reference obtained in 2003, and believed to be based on a talk presented Jan. 25, 2003 (See website http://www.spie.org/Conferences/Programs/03/pw/bios/index.cfm?fuseaction=4957, pp. 1 and 4 of 6).

Device Materials Based on Er-, Ho-, Tm-, and Yb-Doped Rare Earth Aluminum Oxide (REAl™) GLASS, Weber et al., reference obtained in 2003,and believed to be based on a talk presented Jan. 28, 2003 (see website http://www.spie.org/Conferences/Programs/03/pw/opto/index.cfm?fuseaction=4999, pp. 1 and 2 of 5).

"DURABLE 3—5 μm Transmitting Infrared Window Materials," Harris et al., Infrared Physics & Technology 39, 1998, pp. 185-201, no month.

"Erbium-Doped Phosphate Glass Waveguide on Silicon with 4.1 dB/cm Gain at 1.535 μm," Yan et al., Appl. Phys. Lett, 71 (20), Nov. 17, 1997.

Abstract for "Kinetics of Nonisothermal Sintering of Some Eutectic Oxide Compositions," I. Yu Volkova et al., 1986 (abstract from Database Chemabs 'Online! Chemical Abstracts Service, Columbus, Ohio, US), no month.

"Eutectic Precipitation of the Spinel Solid Solution -Yttrium Aluminum Garnet (YAG) System," Shuqiang Wang et al., *Journal of the American Ceramic Society*, 1998, vol. 81, No. 1, pp. 263-265, no month.

"Microstructures of laser-treated $Al_2O_3$-$ZrO_2$-$CeO_2$ composites," Zan-Hwey Chen et al., *Materials Science & Engineering A (Structural Materials: Properties, Microstructure and Processing)*, 1995, no month vol. A196, No. 1-2, pp. 253-260.

"Advances in the Grinding Efficiency of Sintered Alumina Abrasives," Andreas Krell et al., *Journal of the American Ceramic Society*, 1996, vol. 79, No. 3, pp. 763-769, no month.

"Interface modification for increased fracture toughness in reaction-formed yttrium aluminum garnet/alumina eutectic composites," Luke N. Brewer et al., 1999, vol. 14, No. 10, pp. 3907-3912, no month.

Dow Jones Interactive Internet Printout on Jun. 20, 2001 for web address "http://ptg.djnr.com/ccroot/asp/publib/story.asp"; "China's Rare Earth Industry In the Doldrums", Asia Pulse, Jan. 28, 1999, 2 pages.

Dow Jones Interactive Internet Printout on Jun. 20, 2001 for web address "http://ptg.djnr.com/ccroot/asp/publib/story.asp"; "China's Rare Earth Export Quota Set at 45,000 Tons", Asia Pulse, Jan. 9, 2001, 1 page.

Dow Jones Interactive Internet Printout on Jun. 20, 2001 for web address "http://ptg.djnr.com/ccroot/asp/publib/story.asp"; "ELEMENTS: China to Impose Quotas on Rare Earth Exports", Chemical Business NewsBase, Feb. 4, 1999, 1 page.

Dow Jones Interactive Internet Printout on Jun. 20, 2001 for web address "http://ptg.djnr.com/ccroot/asp/publib/story.asp"; "Rare Earth Prices and Market Outlook", Chemical Business NewsBase, May 27, 1999, 2 pages.

Dow Jones Interactive Internet Printout on Jun. 20, 2001 for web address "http://ptg.djnr.com/ccroot/asp/publib/story.asp"; "In Asia", Engineering & Mining Journal, Feb. 28, 2000, 4 pages.

Dow Jones Interactive Internet Printout on Jun. 20, 2001 for web address "http://ptg.djnr.com/ccroot/asp/publib/story.asp"; "Rare Earths: An Industry Review and Market Outlook—Part 1", Chemical Business NewsBase, Dec. 8, 2000, 2 pages.

Dow Jones Interactive Internet Printout on Jun. 20, 2001 for web address "http://ptg.djnr.com/ccroot/asp/publib/story.asp"; "Traders' View on Chemical Business (Part 2): Rare Earth: Market Confusion Inevitable Due to China's Unstable Supply", Chemical Business NewsBase, Aug. 10, 2000, 2 pages.

"China: Oversupply Puts Rare Earths Projects On Hold", Industrial Minerals, Aug., 1997, 1 page.

"Increase in Value of Rare Earth Products Boosts Yixing Xinwei", W. Yau, South China Morning Post, Apr. 12, 2000, 2 pages.

"Rare Earth—Market Confusion Inevitable Due to China's Unstable Supply", Japan Chemical Week, vol. 41, No. 2080, Jul. 6, 2000, pp. 6-7.

"Rare Earths Prices Recover Despite China's Overcapacity", Louise Rodriquez, America Metal Market, vol. 109, No. 14, Jan. 22, 2001, p. 13.

"Prices: Minerals", Asian Ceramics & Glass, Jan. 2001, 2 pages.

"China Rare Earth Information", China Rare Earth Information Center, vol. 6, No. 4, Aug. 2000, 3 pages.

"Microstructure and Thermal Stability of $Al_2O_3$/$Y_3Al_5O_{12}$ (YAG) Eutectic Composite Prepared by an Arc Discharge Method", T. Isobe et al., J. Ceram. Soc. Jap., 109, [1], 2001, pp. 66-70, Abstract in English, no month.

"Divorced Eutectic and Interface Characteristics in a Solidified YAG-Spinel Composite With Spinel-Rich Composition", S. Wang et al., J. Mat. Sci., 35, 2000, pp. 2757-2761, no month.

"Processing, Microstructured, and Strength of Alumina-YAG Eutectic Polycrystals", Tai-Il Mah et al., J. Am. Ceram. Soc., 83, [8], 2000, pp. 2088-2090, no month.

"Phase Identification of $Al_2O_3$/$RE_3Al_5O_{12}$ and $Al_2O_3$/$REAlO_3$ (RE=Sm-Lu, Y) Eutectics", J. Crystal Growth, 218, 2000, pp. 67-73, no month.

"Crystallization and Thermal Properties of $Al_2O_3$-$Y_2O_3$ Melts", S. V. Stankus et al., J. Crystal Growth, 167, 1996, pp. 165-170, no month.

Dialog © file 319: Chem Bus NewsBase © 2001 Royal Soc Chemistry. Abstract for "China: Oversupply Puts Rare Earths Projects On Hold", Industrial Minerals n 359, p. 10, no month.

"Rare-Earth Metals", J. Hedrick, pp. 61.1-61.6, 1997, no month.

"Rare-Earth Metal Prices in the USA ca. 1960 to 1994", J. Hedrick, J. Alloys and Compounds, 1997, pp. 471-481, no month.

"Preliminary data on subsolidus phase equilibria in the $La_2O_3$-$Al_2O_3$-$Mn_2O_3$ and $La_2O_3$-$Al_2O_3$-$Fe_2O_3$ systems", Hrovat et al., *Journal of Materials Science Letters*, vol. 14, 1995, pp. 265-267, no month.

"Aspects of Synthesis of Decorite Opacified Glass", Keramika, *Glass and Ceramics*, vol. 58, Nos. 1-2, pp. 8-11, Jan., 2001.

"A New Ceramic Eutectic Composite with High Strength at 1873 K", Yoshiharu Waku, *Advanced Materials*, vol. 10, No. 8, 1998, pp. 615-617, no month.

"Synthesis of Y-Al Garnet", Krokhin et al., *Glass and Ceramcis*, vol. 55, Nos. 5-6, 1998, pp. 151-152, no month.

"High-temperature strength and thermal stability of a unidirectionally solidified $Al_2O_3$/YAG eutectic composite", Waku et al., pp. 1217-1225, no date.

"Sapphire matrix composites reinforced with single crystal VAG phases", Waku et al., *Journal of Materials Science*, vol. 31, 1996, pp. 4663-4670, no month.

"Thermo-Mechanical Stability Of Directionally Solidified $Al_2O_3$-$ZrO_2(Y_2O_3)$ Eutectic Fibers", Yang and Zhu, *Scripta Materialia*, vol. 36, No. 8, 1997, pp. 961-965, no month.

"A ductile ceramic eutectic composite with high strength at 1,873 K", Waku et al., *Nature*, vol. 389, Sep. 1997, pp. 49-52.

"The Liquidus Surface In The $Al_2O_3$-$ZrO_2$-$Y_2O_3$ Phase Diagram", Lakiza et al., *Powder Metallurgy and Metal Ceramics*, vol. 33, No. 11-12, 1994, pp. 595-597, no month.

"Powder-Material Research Methods And Properties Polythermal Sections Of The $Al_2O_3$-$ZrO_2$-$Y_2O_3$ Phase Diagram", Lakiza et al., *Powder Metallurgy and Metal Ceramics*, vol. 34, No. 11-12, 1995, pp. 655-659, no month.

"Metastable Phase Relationships In The System $Al_2O_3$-$ZrO_2$-$Y_2O_3$", Lakiz and Lopato, *Powder Metallurgy and Metal Ceramics*, vol. 35, Nos. 11-12, 1996, pp. 621-626, no month.

"Solidus Surface And Phase Equilibria During The Solidification Of Alloys In The $Al_2O_3$-$ZrO_2$-$Y_2O_3$ System", Lakiza et al., *Powder Metallurgy and Metal Ceramics*, vol. 34, Nos. 1-2, 1995, pp. 64-67, no month.

"Methods Of Investigation Of Properties Of Powder Materials, Interactions In The $Al_2O_3$-$ZrO_2$-$Y_2O_3$ System", Lakiza et al., *Powder Metallurgy and Metal Ceramics*, vol. 33, Nos. 9-10, 1994, pp. 486-490, no month.

"Rapid Solidification of Ceramics a Technology Assessment", Brockway et al. *Metals and Ceramics Information Center*, MCIC Report, Jan. 1984 MCIC 84-49.

Figs. 311, 346, 350,354-56,,373, and 716, *Phase Diagrams For Ceramists*, The American Ceramic Society, 1964, pp. 122, 136, 138, 140, 144, 248, no month.

Figs. 2340-44, 2363, 2370, 2374-75, 2382-83, 2385, 2387, 2390, and 2392, *Phase Diagrams For Ceramists, 1969 Supplement*, The American Ceramic Society, 1969, pp. 95-96, 100, 102-103, 105-108, no month.

Figs. 4366-71, 4377-78, 4404-05, 4417, 4426, 4430, 4433, 4437, 4440, 4444, 4457, 4572, and 4602, *Phase Diagrams For Ceramists, 1975 Supplement*, The American Ceramic Society, 1975, pp. 130-132, 135-136, 147, 152, 157, 159-160, 163-164, 166, 172-173, 238, 257, no month.

Figs. 5042, 5211, 5217, 5224, 5228, 5232, 5237, 5239, 5241, 5245, 5251, 5257, 5418, and 5437, *Phase Diagrams For Ceramists, vol. IV*, The American Ceramic Society, 1981, pp. 29, 125, 127, 129-131, 133, 135-137, 139, 141, 143, 220, 228, no month.

Fig. 6464, *Phase Diagrams For Ceramists, vol. VI*, The American Ceramic Society, 1981, p. 162, no month.

Figs. 9262, and 9264, *Phase Diagrams For Ceramists, vol. XI, Oxides*, The American Ceramic Society, 1995, pp. 105-106, no month.

"Phase Equilibria in the Yttrium Oxide-Alumina System", Toropov et al., *Bulletin of the Academy of Sciences, USSR*, Division of Chemical Science, No. 7, Jul., 1964, pp. 1076-1081, A translation of *Seriya Khimicheskaya*.

McKittrick, Joanna, et al., "Non-stoichiometry and defect structures in rapidly solidified MgO-$Al_2O_3$-$ZrO_2$ ternary eutectics," *Materials Science and Engineering* A231 (1997) 90-97, no month.

Weber, J.K. Richard et al., "Glass fibres of pure and erbium- or neodymium-doped yttria-alumina compositions", Nature, Jun. 25, 1998, vol. 393, pp. 769-771.

Waku, Yoshiharu, et al., "A jelly-like ceramic fiber at 1193 K", Mat Res Innovat, 2000, vol. 3, pp. 185-189, no month.

Weber, J.K. Richard et al., "Glass Formation and Polyamorphism in Rare-Earth Oxide-Aluminum Oxide Compositions", J. American Ceramic Society, 83 [8], 2000, 1868-1872, no month.

Aguilar, E.A., "Processing and crystallization of rapidly solidified $Al_2O_3$-$Y_2O_3$ fibres", British Ceramic Transactions, 2000, vol. 99, No. 6, pp. 256-259, no month.

U.S. Patent Application entitled "Fused $Al_2O_3$-$Y_2O_3$ Eutectic Abrasive Particles, Abrasive Articles, And Methods Of Making And Using The Same", filed Jul. 19, 2000, Rosenflanz et al. Having U.S. Appl. No. 09/620,262.

U.S. Patent Application entitled "Fused-$Al_2O_3$-MgO-$Y_2O_3$ Eutectic Abrasive Particles, Abrasive Articles, And Methods Of Making And Using The Same", filed Nov. 2, 2000, Rosenflanz having U.S. Appl. No. 09/704,843.

U.S. Patent Application entitled "Fused $Al_2O_3$ Rare Earth Oxide Eutectic Abrasive Particles, Abrasive Articles, And Methods Of Making And Using The Same", filed Jul. 19, 2000, Rosenflanz et al. having U.S. Appl. No. 09/618, 879.

U.S. Patent Application entitled "Fused Abrasive Particles, Abrasive Articles, And Methods Of Making And Using The Same", filed Jul. 19, 2000, Rosenflanz et al. having U.S. Appl. No. 09/619,191.

U.S. Patent Application entitled "Fused Aluminum Oxycarbide/ Nitride- $Al_2O_3$ Rare Earth Oxide Eutectic Abrasive Particles, Abrasive Articles, And Methods Of Making And Using The Same", filed Jul. 19, 2000, Rosenflanz having U.S. Appl. No. 09/619,289.

U.S. Patent Application entitled "Fused Aluminum Oxycarbide/ Nitride-$Al_2O_3$ Rare Earth Oxide Eutectic Materials", filed Jul. 19, 2000, Rosenflanz having U.S. Appl. No. 09/619,106.

U.S. Patent Application entitled "Fused $Al_2O_3$-$Y_2O_3$-$ZrO_2$ Eutectic Abrasive Particles, Abrasive Articles, And Methods Of Making And Using The Same", filed Jul. 19, 2000, Rosenflanz having U.S. Appl. No. 09/618,876.

U.S. Patent Application entitled "Fused $Al_2O_3$-Rare Earth Oxide-$ZrO_2$ Eutectic Materials", filed Jul. 19, 2000, Rosenflanz having U.S. Appl. No. 09/619,192.

U.S. Patent Application entitled "Fused $Al_2O_3$-Rare Earth Oxide-$ZrO_2$ Eutectic Abrasive Particles, Abrasive Articles, And Methods Of Making And Using The Same", filed Jul. 19, 2000, Rosenflanz having U.S. Appl. No. 09/619,744.

U.S. Patent Application entitled "Fused $Al_2O_3$ Rare Earth Oxide $ZrO_2$ Eutectic Materials", filed Jan. 30, 2001, Rosenflanz having U.S. Appl. No. 09/772,730.

U.S. Patent Application entitled "$Al_2O_3$-Rare Earth Oxide-$ZrO_2$/ $HfO_2$ Materials, and Methods of Making and Using the Same", filed Aug. 2, 2002, Rosenflanz having U.S. Appl. No. 10/211,597.

U.S. Patent Application entitled "$Al_2O_3$-$Y_2O_3$-$ZrO_2$/$HfO_2$ Materials, and Methods of Making and Using the Same", filed Aug. 2, 2002, Rosenflanz having U.S. Appl. No. 10/211,638.

U.S. Patent Application entitled, "Abrasive Particles, Abrasive Articles, and Methods of Making and Using the Same", filed Aug. 2, 2002, Rosenflanz et al. having U.S. Appl. No. 10/211,598.

U.S. Patent Application entitled, "Abrasive Particles, and Methods of Making and Using the Same", filed Aug. 2, 2002, Rosenflanz et al. having U.S. Appl. No. 10/211,630.

U.S. Patent Application entitled, "Method for Making Amorphous Materials and Ceramics", filed Aug. 2, 2002, Rosenflanz et al. having U.S. Appl. No. 10/211,639.

U.S. Patent Application entitled, "Ceramic Materials, Abrasive Particles, Abrasive Articles, and Methods of Making and Using the Same", filed Aug. 2, 2002, Rosenflanz having U.S. Appl. No. 10/211,034.

U.S. Patent Application entitled, "Glass-Ceramics", filed Aug. 2, 2002, Rosenflanz having U.S. Appl. No. 10/211,044.

U.S. Patent Application entitled, "Alunmina-Zirconia, and Methods of Making and Using the Same", filed Aug. 2, 2002, Rosenflanz et al. having U.S. Appl. No. 10/211,620.

U.S. Patent Application entitled, "Method of Making Ceramic Articles", filed Aug. 2, 2002, Rosenflanz having U.S. Appl. No. 10/211,481.

U.S. Patent Application entitled "Plasma Spraying", filed Aug. 2, 2002, Rosenflanz et al. having U.S. Appl. No. 10/211,640.

U.S. Patent Application entitled "Method of Making Amorphous and Ceramics via Melt Spinning," filed Aug. 2, 2002, Rosenflanz et al. having U.S. Appl. No. 10/211,684.

U.S. Patent Application entitled "Methods of Making Ceramic Particles", filed Feb. 5, 2003, Celikkaya et al. having U.S. Appl. No. 10/358,772.

U.S. Patent Application entitled "Methods of Making Ceramics", filed Feb. 5, 2003, Anderson et al. having U.S. Appl. No. 10/358,765.

U.S. Patent Application entitled "Ceramics and Methods of Making the Same", filed Feb. 5, 2003, Celikkaya et al. having U.S. Appl. No. 10/358,910.

U.S. Patent Application entitled "Methods of Making $Al_2O_3$-$SiO_2$ Ceramics", filed Feb. 5, 2003, Celikkaya et al. having U.S. Appl. No. 10/358,708.

Imakoa, Minoru et al., "Refractive Index and Abbe's Number of Glass of Lanthanum Borate System", Journal Ceramic Assoc. Japan, vol. 70, No. 5, (1962), pp. 115, no month.

Kingery, W.D., Introduction to Ceramics, Second Edition, Chpt. III subchapter 8.8, Glass-Ceramic Materials, pp. 368-374, (1976), no month.

Kokubo, Tadashi et al., "Infrared Transmission of ($R_2O$ or R O)-($TiO_2$, $Nb_2O_5$ or $Ta_2O_5$)-$Al_2O_3$ Glasses", Journal of Non-Crystalline Solids 22 (1970) 125-134, no month.

McMillan, P.W., *Glass-Ceramics*, Academic Press, Inc., 2$^{nd}$ Edition (1979)** no month.

Stookey, S. D., Ceramics Made by Nucleation of Glass-Comparison of Microstructure and Properties with Sintered Ceramics, The American Ceramic Society, (1992), pp. 1-4, no month.

Varshneya, Arun K., "Fundamentsal of Inorganic Glasses", pp. 425-427 (1994), no month.

U.S. Application entitled "Ceramic Aggregate Particles", filed Feb. 11, 2004, having U.S. Appl. No. 10/776,156.

Aasland and McMillan, Nature 369, 633 (1994), no month.

Aguilar et al, "Melt Extraction Processing of Structural $Y_2O_3$-$Al_2O_3$ Fibers", J. Eur. Ceram. Soc. 20 1091-1098 (2000).

Gandhi, A.S. and Jarayam, V., "Pressure Consolidation of Amorphous $ZrO_2$-$Al_2O_3$ by Plastic Deformation of Powder Particles", Acta Materials, 50 (2002), 2137-2149, no month.

Gonzalez, Eduardo J., et al., "High Pressure Compaction and Sintering of Nano-Size $\gamma$-$Al_2O_3$ Powder", *Materials and Manufacturing Processes* vol. 11, No. 6, 951-967, 1996, no month.

Jantzen, C.M., Krepski, R.P., & Herman, H., "Ultra-Rapid Quenching of Laser-Method Binary and Unary Oxides", *Mat. Res. Bull.* 15, 1313-1326 (1980), no month.

Khor K.A., "Novel ZrO2-Mullite Composites Produced By Plasma Spraying", Proceedings of the 15$^{th}$ International Thermal Pray Conference, May 25-29, 1998, Nice, France.

Ray, C.S. and Day, D.E., "Determining the Nucleation Rate Curve for Lithium Disilicate Glass by Differential Thermal Analysis", J. Am. Ceram. Soc. 73(2) 439-442 (1990), no month.

Schmucker, M, et al., "Constitution of Mullite Glasses Produced by Ultra-Rapid Quenching of Plasma-Sprayed Melts", Journal of the European Ceramic Society 15 (1995) 1201-1205, no month.

Sarjeant, P.T. & Roy, R., in *Reactivity of Solids* (ed. J. W. Mitchell, R.C., DeVries, R.W., Roberts and P. Cannon) 725-33 (John Wiley & Sons, Inc., New York 1969), no month.

Takamori, T., & Roy, R., "Rapid Crystallization of SiO2-Al2O3 Glasses", Journal of American Society, vol. 56, No. 12, Dec. 1973.

Weber et al., "Synthesis and Optical Properties of Rare-Earth-Aluminum Oxide Glasses", J. Am. Ceram. Soc. 85(5) 1309-1311 (2002), no month.

Wilding, M.C., McMillan, P.F., "Polyamorphic Transitions in Yttria-Alumina Liquids", *J. Non-Cryst. Solids*. 293-295, 357-365 (2001).

* cited by examiner

$Al_2O_3$-$La_2O_3$-$Y_2O_3$-MGO CERAMICS, AND METHODS OF MAKING THE SAME

BACKGROUND

A large number of glass and glass-ceramic materials are known. The majority of oxide glass systems utilize well-known glass-formers such as $SiO_2$, $B_2O_3$, $P_2O_5$, $GeO_2$, $TeO_2$, $As_2O_3$, and $V_2O_5$ to aid in the formation of the glass. Some of the glass compositions formed with these glass-formers can be heat-treated to form glass-ceramics. The upper use temperature of glasses and glass-ceramics formed from such glass formers is generally less than 1200° C., typically about 700–800° C. The glass-ceramics tend to be more temperature resistant than the glass from which they are formed.

In addition, many properties of known glasses and glass-ceramics are limited by the intrinsic properties of glass-formers. For example, for $SiO_2$, $B_2O_3$, and $P_2O_5$-based glasses and glass-ceramics, the Young's modulus, hardness, and strength are relatively low. Such glass and glass-ceramics generally have inferior mechanical properties as compared, for example, to $Al_2O_3$ or $ZrO_2$.

Some less or non-conventional glasses such as glasses based on rare earth oxide-aluminum oxide (see, e.g., U.S. Pat. No. 6,482,758 (Weber) and Japanese Document No. JP 2000-045129, published Feb. 15, 2000) are known, additional novel glasses and glass-ceramic, as well as use in new applications for both known and novel glasses and glass-ceramics, is desired.

SUMMARY

The present invention provides ceramics such as glasses (including ceramics comprising glass) and glass-ceramics.

In one aspect, the present invention provides a glass comprising $Al_2O_3$, $La_2O_3$, $Y_2O_3$, and MgO, wherein at least 70 (in some embodiments, at least 75, 80, 85, 90, 95, 97, 98, 99, or even 100) percent by weight of the glass collectively comprises the $Al_2O_3$, $La_2O_3$, $Y_2O_3$, and MgO, based on the total weight of the glass, and wherein at least 70 (in some embodiments, at least 75, 80, 85, or even at least 90) percent by weight of the collective weight of the $Al_2O_3$, $La_2O_3$, $Y_2O_3$, and MgO is $Al_2O_3$. In some embodiments, the glass comprises not more than 30 (in some embodiments, not more than 25, 20, 15, 10, 5, 3, 2, 1, or even zero) percent by weight collectively $SiO_2$, $B_2O_3$, and $P_2O_5$, based on the total weight of the glass. In some embodiments, the glass comprises not more than 10 (in some embodiments, not more than 5, 3, 2, 1, or even zero) percent by weight $SiO_2$, based on the total weight of the glass. In some embodiments, the glass comprises not more than 10 (in some embodiments, not more than 5, 3, 2, 1, or even zero) percent by weight $SiO_2$ and not more than 10 (in some embodiments, not more than 10, 5, 3, 2, 1, or even zero) percent by weight $B_2O_3$, based on the total weight of the glass. In some embodiments, the glass comprises not more than 10 (in some embodiments, not more than 5, 3, 2, 1, or even zero) percent by weight collectively $SiO_2$, $B_2O_3$, and $P_2O_5$, based on the total weight of the glass. In some embodiments, it is desirable for the glass to comprise up to 10 (in some embodiments, in a range from 0.5 to 10, 0.5 to 5, 0.5 to 2, or even 0.5 to 1) percent by weight $SiO_2$, based on the total weight of the glass.

In another aspect, the present invention provides a method for making glass according to the present invention. In one exemplary method for making a glass according to the present invention, the method comprises providing a melt comprising sources of at least $Al_2O_3$, $La_2O_3$, $Y_2O_3$, and MgO (e.g., melting sources of at least $Al_2O_3$, $La_2O_3$, $Y_2O_3$, and MgO to provide a melt), and cooling the melt to provide the glass. In another aspect, the present invention provides a method for making ceramic comprising glass, according to the present invention, the method comprising providing a melt comprising sources of at least $Al_2O_3$, $La_2O_3$, $Y_2O_3$, and MgO (e.g., melting sources of at least $Al_2O_3$, $La_2O_3$, $Y_2O_3$, and MgO to provide a melt), and cooling the melt to provide the ceramic.

In another aspect, the present invention provides a method for making an article comprising glass according to the present invention. In another exemplary method for making such an article, the method comprises:

providing a melt comprising sources of at least $Al_2O_3$, $La_2O_3$, $Y_2O_3$, and MgO (e.g., melting sources of at least $Al_2O_3$, $La_2O_3$, $Y_2O_3$, and MgO to provide a melt);

cooling the melt to provide glass beads comprising glass according to the present invention, the glass having a $T_g$;

heating the glass beads above the $T_g$ such that the glass beads coalesce to form a shape; and cooling the coalesced shape to provide the article.

In another aspect, the present invention provides a method for making an article comprising glass according to the present invention. In one exemplary method for making such an article, the method comprising:

providing a melt comprising sources of at least $Al_2O_3$, $La_2O_3$, $Y_2O_3$, and MgO (e.g., melting sources of at least $Al_2O_3$, $La_2O_3$, $Y_2O_3$, and MgO to provide a melt);

cooling the melt to provide glass beads comprising glass according to the present invention, the glass having a $T_g$;

crushing the glass beads to provide glass powder;

heating the glass powder above the $T_g$ such that the glass powder coalesces to form a shape; and cooling the coalesced shape to provide the article.

In another aspect, the present invention provides a glass-ceramic, the glass-ceramic comprising $Al_2O_3$, $La_2O_3$, $Y_2O_3$, and MgO, wherein at least 70 (in some embodiments, at least 75, 80, 85, 90, 95, 97, 98, 99, or even 100) percent by weight of the glass-ceramic collectively comprises the $Al_2O_3$, $La_2O_3$, $Y_2O_3$, and MgO, based on the total weight of the glass-ceramic, and wherein at least 70 (in some embodiments, at least 75, 80, 85, or even at least 90) percent by weight of the collective weight of the $Al_2O_3$, $La_2O_3$, $Y_2O_3$, and MgO is $Al_2O_3$. In some embodiments, the glass-ceramic comprises not more than 30 (in some embodiments, not more than 25, 20, 15, 10, 5, 3, 2, 1, or even zero) percent by weight collectively $SiO_2$, $B_2O_3$, and $P_2O_5$, based on the total weight of the glass-ceramic. In some embodiments, the glass-ceramic comprises not more than 10 (in some embodiments, not more than 5, 3, 2, 1, or even zero) percent by weight $SiO_2$, based on the total weight of the glass-ceramic. In some embodiments, the glass-ceramic comprises not more than 10 (in some embodiments, not more than 5, 3, 2, 1, or even zero) percent by weight $SiO_2$ and not more than 10 (in some embodiments, not more than, 5, 3, 2, 1, or even zero) percent by weight $B_2O_3$, based on the total weight of the glass-ceramic. In some embodiments, the glass-ceramic comprises not more than 10 (in some embodiments, not more than 5, 3, 2, 1, or even zero) percent by weight collectively $SiO_2$, $B_2O_3$, and $P_2O_5$, based on the total weight of the glass-ceramic. In some embodiments, it is desirable for the glass-ceramic to comprise up to 10 (in some embodiments, in a range from 0.5 to 10, 0.5 to 5, 0.5 to 2, or even 0.5 to 1) percent by weight $SiO_2$, based on the total weight of the glass.

In another aspect, the present invention provides a glass-ceramic comprising $Al_2O_3$, $La_2O_3$, $Y_2O_3$, and MgO, wherein the ceramic (a) exhibits a microstructure comprising crystallites having an average crystallite size of less than 1 micrometer (in some embodiments, less than 500 nanometers, 400 nanometers, 300 nanometers, 250 nanometers, 200 nanometers, 150 nanometers, or even less than 100 nanometers), and (b) is free of eutectic microstructure features, wherein at least a portion of the $Y_2O_3$ is present as a distinct crystalline phase (typically, at least 25 (in some embodiments, at least 50, 75, or even 100) percent by weight of the $Y_2O_3$ is present as a distinct crystalline phase). A "distinct crystalline phase" is a crystalline phase (including a crystalline complex metal oxide) that is detectable by x-ray diffraction as opposed to a phase that is present in solid solution with another distinct crystalline phase. For example, it is well known that oxides such as $Y_2O_3$ or $CeO_2$ may be in solid solution with a crystalline $ZrO_2$ and serve as a phase stabilizer. The $Y_2O_3$ or $CeO_2$ in such instances is not a distinct crystalline phase.

In another aspect, the present invention provides a glass-ceramic comprising $Al_2O_3$, $La_2O_3$, $Y_2O_3$, and MgO, wherein the glass-ceramic (a) exhibits a microstructure comprising crystallites having an average crystallite size of less than 200 nanometers (in some embodiments, 150 nanometers, or even less than 100 nanometers) and (b) has a density of at least 90% (in some embodiments, 95%, 96%, 97%, 98%, 99%, 99.5%, or 100%) of theoretical density, wherein at least a portion of the $Y_2O_3$ is present as a distinct crystalline phase (typically, at least 25 (in some embodiments, at least 50, 75, or even 100) percent by weight of the $Y_2O_3$ is present as a distinct crystalline phase).

In another aspect, the present invention provides a glass-ceramic comprising $Al_2O_3$, $La_2O_3$, $Y_2O_3$, and MgO, wherein the glass-ceramic (a) exhibits a microstructure comprising crystallites, and wherein none of the crystallites are greater than 200 nanometers (in some embodiments, none greater than 150 nanometers) in size and (b) has a density of at least 90% (in some embodiments, 95%, 96%, 97%, 98%, 99%, 99.5%, or 100%) of theoretical density, wherein at least a portion of the $Y_2O_3$ is present as a distinct crystalline phase (typically, at least 25 (in some embodiments, at least 50, 75, or even 100) percent by weight of the $Y_2O_3$ is present as a distinct crystalline phase).

In another aspect, the present invention provides a glass-ceramic comprising $Al_2O_3$, $La_2O_3$, $Y_2O_3$, and MgO, wherein the glass-ceramic (a) exhibits a microstructure comprising crystallites, and wherein at least a portion of the crystallites are not greater than 150 nanometers (in some embodiments, none greater than 100 nanometers) in size and (b) has a density of at least 90% (in some embodiments, 95%, 96%, 97%, 98%, 99%, 99.5%, or 100%) of theoretical density, wherein at least a portion of the $Y_2O_3$ is present as a distinct crystalline phase (typically, at least 25 (in some embodiments, at least 50, 75, or even 100) percent by weight of the $Y_2O_3$ is present as a distinct crystalline phase).

In another aspect, the present invention provides a ceramic comprising at least 75 (in some embodiments, 80, 85, 90, 91, 92, 93, 94, 95, 96, 97, 98, 99, 99.5, or even 100) percent by volume crystalline ceramic, the crystalline ceramic comprising $Al_2O_3$, $La_2O_3$, $Y_2O_3$, and MgO, wherein the ceramic (a) exhibits a microstructure comprising crystallites having an average crystallite size of less than 200 nanometers (in some embodiments, less than 150 nanometers, or even less than 100 nanometers) and (b) has a density of at least 90% (in some embodiments, 95%, 96%, 97%, 98%, 99%, 99.5%, or 100%) of theoretical density, wherein at least a portion of the $Y_2O_3$ is present as a distinct crystalline phase (typically, at least 25 (in some embodiments, at least 50, 75, or even 100) percent by weight of the $Y_2O_3$ is present as a distinct crystalline phase).

In another aspect, the present invention provides a ceramic comprising at least 75 (in some embodiments, 80, 85, 90, 91, 92, 93, 94, 95, 96, 97, 98, 99, 99.5, or even 100) percent by volume crystalline ceramic, the crystalline ceramic comprising $Al_2O_3$, $La_2O_3$, $Y_2O_3$, and MgO, wherein the ceramic (a) exhibits a microstructure comprising crystallites, and wherein none of the crystallites are greater than 200 nanometers (in some embodiments, none greater than 150 nanometers, or even none greater than 100 nanometers) in size and (b) has a density of at least 90% (in some embodiments, 95%, 96%, 97%, 98%, 99%, 99.5%, or 100%) of theoretical density, wherein at least a portion of the $Y_2O_3$ is present as a distinct crystalline phase (typically, at least 25 (in some embodiments, at least 50, 75, or even 100) percent by weight of the $Y_2O_3$ is present as a distinct crystalline phase).

In another aspect, the present invention provides a ceramic comprising at least 75 (in some embodiments, 80, 85, 90, 91, 92, 93, 94, 95, 96, 97, 98, 99, 99.5, or even 100) percent by volume crystalline ceramic, the crystalline ceramic comprising $Al_2O_3$, $La_2O_3$, $Y_2O_3$, and MgO, wherein the ceramic (a) exhibits a microstructure comprising crystallites, and wherein at least a portion of the crystallites are not greater than 150 nanometers (in some embodiments, not greater than 100 nanometers) in size and (b) has a density of at least 90% (in some embodiments, 95%, 96%, 97%, 98%, 99%, 99.5%, or 100%) of theoretical density, wherein at least a portion of the $Y_2O_3$ is present as a distinct crystalline phase (typically, at least 25 (in some embodiments, at least 50, 75, or even 100) percent by weight of the $Y_2O_3$ is present as a distinct crystalline phase).

In another aspect, the present invention provides a ceramic comprising at least 75 (in some embodiments, 80, 85, 90, 91, 92, 93, 94, 95, 96, 97, 98, 99, 99.5, or even 100) percent by volume crystalline ceramic, the crystalline ceramic comprising $Al_2O_3$, $La_2O_3$, $Y_2O_3$, and MgO, wherein the ceramic (a) exhibits a microstructure comprising crystallites having an average crystallite size not greater than 200 nanometer (in some embodiments, not greater than 150 nanometers, or even not greater than 100 nanometers) in size and (b) has a density of at least 90% (in some embodiments, 95%, 96%, 97%, 98%, 99%, 99.5%, or 100%) of theoretical density, wherein at least a portion of the $Y_2O_3$ is present as a distinct crystalline phase (typically, at least 25 (in some embodiments, at least 50, 75, or even 100) percent by weight of the $Y_2O_3$ is present as a distinct crystalline phase).

In another aspect, the present invention provides a method for making glass-ceramic according to the present invention. In one exemplary method for making a glass-ceramic according to the present invention, the method comprises heat-treating glass comprising $Al_2O_3$, $La_2O_3$, $Y_2O_3$, and MgO (typically a glass according to the present invention) to convert at least a portion of the glass to glass-ceramic (i.e., at least a portion of the glass crystallizes). In another aspect, the present invention provides a method for making glass-ceramic according to the present invention, the method comprising heat-treating ceramic comprising glass, the glass comprising $Al_2O_3$, $La_2O_3$, $Y_2O_3$, and MgO (typically a glass according to the present invention) to convert at least a portion of the glass to glass-ceramic.

In another aspect, the present invention provides a method for making a glass-ceramic article. In one exemplary method for making such an article, the method comprises:

providing glass beads, the glass comprising $Al_2O_3$, $La_2O_3$, $Y_2O_3$, and MgO (typically a glass according to the present invention), the glass having a $T_g$;

heating the glass beads above the $T_g$ such that the glass beads coalesce to form a shape;

cooling the coalesced shape to provide the article; and heat-treating the glass article to convert at least a portion of the glass to glass-ceramic and provide the glass-ceramic article.

In another exemplary method for making a glass-ceramic article, the method comprises:

providing glass powder (e.g., crushing glass (e.g., glass beads) to provide glass powder), the glass comprising $Al_2O_3$, $La_2O_3$, $Y_2O_3$, and MgO (typically a glass according to the present invention), the glass having a $T_g$;

heating the glass powder above the $T_g$ such that the glass powder coalesces to form a shape;

cooling the coalesced shape to provide a glass article; and heat-treating the glass article to convert at least a portion of the glass to glass-ceramic and provide the glass-ceramic article.

Some embodiments of ceramics according to the present invention may comprise glass (e.g., the glass of a glass-ceramic) in an amount, for example, of at least 1, 2, 3, 5, 10, 15, 20, 25, 30, 35, 40, 45, 50, 55, 60, 65, 70, 75, 80, 85, 90, 95, or even 100 percent by volume, based on the total volume of the ceramic. Some embodiments of ceramics according to the present invention may comprise crystalline ceramic (e.g., the crystalline ceramic of a glass-ceramic), for example, of at least 1, 2, 3, 5, 10, 15, 20, 25, 30, 35, 40, 45, 50, 55, 60, 65, 70, 75, 80, 85, 90, 95, 97, 98, 99, or even 100 percent by volume, based on the total volume of the ceramic.

In this application:

"amorphous material" refers to material derived from a melt and/or a vapor phase that lacks any long range crystal structure as determined by X-ray diffraction and/or has an exothermic peak corresponding to the crystallization of the amorphous material as determined by a DTA (differential thermal analysis) as determined by the test described herein entitled "Differential Thermal Analysis";

"ceramic" includes glass, crystalline ceramic, glass-ceramic, and combinations thereof;

"complex metal oxide" refers to a metal oxide comprising two or more different metal elements and oxygen (e.g., $CeAl_{11}O_{18}$, $Dy_3Al_5O_{12}$, $MgAl_2O_4$, and $Y_3Al_5O_{12}$);

"complex $Al_2O_3$-metal oxide" refers to a complex metal oxide comprising, on a theoretical oxide basis, $Al_2O_3$ and one or more metal elements other than Al (e.g., $CeAl_{11}O_{18}$, $Dy_3Al_5O_{12}$, $MgAl_2O_4$, and $Y_3Al_5O_{12}$);

"complex $Al_2O_3 \cdot Y_2O_3$" refers to a complex metal oxide comprising, on a theoretical oxide basis, $Al_2O_3$ and $Y_2O_3$ (e.g., $Y_3Al_5O_{12}$);

"complex $Al_2O_3 \cdot REO$" refers to a complex metal oxide comprising, on a theoretical oxide basis, $Al_2O_3$ and rare earth oxide (e.g., $CeAl_{11}O_{18}$ and $Dy_3Al_5O_{12}$);

"glass" refers to amorphous material exhibiting a glass transition temperature;

"glass-ceramic" refers to ceramic comprising crystals formed by heat-treating glass;

"$T_g$" refers to the glass transition temperature as determined by the test described herein entitled "Differential Thermal Analysis";

"$T_x$" refers to the crystallization temperature as determined by the test described herein entitled "Differential Thermal Analysis";

"rare earth oxides" refers to cerium oxide (e.g., $CeO_2$), dysprosium oxide (e.g., $Dy_2O_3$), erbium oxide (e.g., $Er_2O_3$), europium oxide (e.g., $Eu_2O_3$), gadolinium (e.g., $Gd_2O_3$), holmium oxide (e.g., $Ho_2O_3$), lanthanum oxide (e.g., $La_2O_3$), lutetium oxide (e.g., $Lu_2O_3$), neodymium oxide (e.g., $Nd_2O_3$), praseodymium oxide (e.g., $Pr_6O_{11}$), samarium oxide (e.g., $Sm_2O_3$), terbium (e.g., $Tb_2O_3$), thorium oxide (e.g., $Th_4O_7$), thulium (e.g., $Tm_2O_3$), and ytterbium oxide (e.g., $Yb_2O_3$), and combinations thereof; and "REO" refers to rare earth oxide(s).

Further, it is understood herein that unless it is stated that a metal oxide (e.g., $Al_2O_3$, complex $Al_2O_3 \cdot$ metal oxide, etc.) is crystalline, for example, in a glass-ceramic, it may be glass, crystalline, or portions glass and portions crystalline. For example if a glass-ceramic comprises $Al_2O_3$ and $ZrO_2$, the $Al_2O_3$ and $ZrO_2$ may each be in a glass state, crystalline state, or portions in a glass state and portions in a crystalline state, or even as a reaction product with another metal oxide(s) (e.g., unless it is stated that, for example, $Al_2O_3$ is present as crystalline $Al_2O_3$ or a specific crystalline phase of $Al_2O_3$ (e.g., alpha $Al_2O_3$), it may be present as crystalline $Al_2O_3$ and/or as part of one or more crystalline complex $Al_2O_3 \cdot$ metal oxides).

In general, typical advantages of the $Al_2O_3$—$La_2O_3$—$Y_2O_3$—MgO system include the ability to form glasses with relatively high amounts of $Al_2O_3$ (i.e., at least 70 (in some embodiments, at least 75, 80, 85, or even 90) percent by weight), embodiments of which have a relatively wide working range (i.e., $T_x$-$T_g$ being greater than 20° C.). Embodiments of the glasses can be coalesced to provide glass articles having a large variety of shapes and sizes. Furthermore, embodiments of the $Al_2O_3$—$La_2O_3$—$Y_2O_3$—MgO-based glasses can be crystallized to provide glass ceramics. Embodiments of the glass-ceramics have both very fine crystalline structures (i.e., crystallites of at least one phase with an average crystallite size less than 1 micrometer, in some embodiments less than 0.5, 0.3, 0.15, even less than 0.1 micrometer) and high densities (i.e., at least 90 percent of theoretical density). Further, the resulting glass ceramics typically have average hardnesses of at least 15 GPa, in some cases more than 16, 17, 18, 19, or even 20 GPa.

Some embodiments of ceramics according to the present invention can be made, formed as, or converted into beads (e.g., beads having diameters of at least 1 micrometers, 5 micrometers, 10 micrometers, 25 micrometers, 50 micrometers, 100 micrometers, 150 micrometers, 250 micrometers, 500 micrometers, 750 micrometers, 1 mm, 5 mm, or even at least 10 mm), articles (e.g., plates), fibers, particles, and coatings (e.g., thin coatings). The beads can be useful, for example, in reflective devices such as retro-reflective sheeting, alphanumeric plates, and pavement markings. The particles and fibers are useful, for example, as thermal insulation, filler, or reinforcing material in composites (e.g., ceramic, metal, or polymeric matrix composites). The thin coatings can be useful, for example, as protective coatings in applications involving wear, as well as for thermal management. Examples of articles according to the present invention include kitchenware (e.g., plates), dental brackets, and reinforcing fibers, cutting tool inserts, abrasive materials, and structural components of gas engines, (e.g., valves and bearings). Other articles include those having a protective coating of ceramic on the outer surface of a body or other substrate. Certain ceramic particles according to the present invention can be particularly useful as abrasive particles. The abrasive particles can be incorporated into an abrasive article, or used in loose form.

Abrasive particles are usually graded to a given particle size distribution before use. Such distributions typically have a range of particle sizes, from coarse particles to fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards (i.e., specified nominal grades) include those known as the American National Standards Institute, Inc. (ANSI) standards, Federation of European Producers of Abrasive Products (FEPA) standards, and Japanese Industrial Standard (JIS) standards. In one aspect, the present invention provides a plurality of abrasive particles having a specified nominal grade, wherein at least a portion of the plurality of abrasive particles are abrasive particles according to the present invention. In some embodiments, at least 5, 10, 15, 20, 25, 30, 35, 40, 45, 50, 55, 60, 65, 70, 75, 80, 85, 90, 95, or even 100 percent by weight of the plurality of abrasive particles are the abrasive particles according to the present invention, based on the total weight of the plurality of abrasive particles.

In another aspect, the present invention provides abrasive particles comprising a glass-ceramic according to the present invention (including glass-ceramic abrasive particles). The present invention also provides a plurality of abrasive particles having a specified nominal grade, wherein at least a portion of the plurality of abrasive particles are abrasive particle according to the present invention. In another aspect, the present invention provides an abrasive article (e.g., a bonded abrasive article, a non-woven abrasive article, or a coated abrasive article) comprising a binder and a plurality of abrasive particles, wherein at least a portion of the abrasive particles are the abrasive particles according to the present invention.

In another aspect, the present invention provides a method for making abrasive particles. In one exemplary method for making abrasive particles, the method comprises heat-treating glass particles, the glass comprising $Al_2O_3$, $La_2O_3$, $Y_2O_3$, and MgO, to convert at least a portion of the glass to glass-ceramic and provide abrasive particles according to the present invention. In some embodiments, the method further comprises grading the abrasive particles according to the present invention to provide a plurality of abrasive particles having a specified nominal grade. In some embodiments, the glass particles to be heat-treated are provided as a plurality of particles having a specified nominal grade, and wherein at least a portion of the particles is a plurality of the glass particles.

In another exemplary method for making abrasive particles, the method comprises heat-treating particles comprising glass, the glass comprising $Al_2O_3$, $La_2O_3$, $Y_2O_3$, and MgO to convert at least a portion of the glass to glass-ceramic and provide abrasive particles according to the present invention. In some embodiments, the method further comprises grading the abrasive particles according to the present invention to provide a plurality of abrasive particles having a specified nominal grade. In some embodiments, the particles comprising glass to be heat-treated are provided as a plurality of particles having a specified nominal grade, and wherein at least a portion of the particles is a plurality of the particles comprising glass.

In another exemplary method for making abrasive particles, the method comprises heat-treating glass comprising $Al_2O_3$, $La_2O_3$, $Y_2O_3$, and MgO to convert at least a portion of the glass to glass-ceramic and crushing the glass-ceramic to provide abrasive particles according to the present invention. In some embodiments, the method further comprises grading the abrasive particles to provide a plurality of abrasive particles having a specified nominal grade.

In another exemplary method for making abrasive particles, the method comprises heat-treating ceramic comprising glass comprising $Al_2O_3$, $La_2O_3$, $Y_2O_3$, and MgO to convert at least a portion of the glass to glass-ceramic and crushing the glass-ceramic to provide abrasive particles according to the present invention. In some embodiments, the method further comprises grading the abrasive particles according to the present invention to provide a plurality of abrasive particles having a specified nominal grade.

Abrasive articles according to the present invention comprise binder and a plurality of abrasive particles, wherein at least a portion of the abrasive particles are the abrasive particles according to the present invention. Exemplary abrasive products include coated abrasive articles, bonded abrasive articles (e.g., wheels), non-woven abrasive articles, and abrasive brushes. Coated abrasive articles typically comprise a backing having first and second, opposed major surfaces, and wherein the binder and the plurality of abrasive particles form an abrasive layer on at least a portion of the first major surface.

In some embodiments, at least 5, 10, 15, 20, 25, 30, 35, 40, 45, 50, 55, 60, 65, 70, 75, 80, 85, 90, 95, or even 100 percent by weight of the abrasive particles in an abrasive article are the abrasive particles according to the present invention, based on the total weight of the abrasive particles in the abrasive article.

The present invention also provides a method of abrading a surface, the method comprising:

contacting abrasive particles according to the present invention with a surface of a workpiece; and moving at least one of the abrasive particles according to the present invention or the contacted surface to abrade at least a portion of the surface with at least one of the abrasive particles according to the present invention.

DETAILED DESCRIPTION

Figure 1:
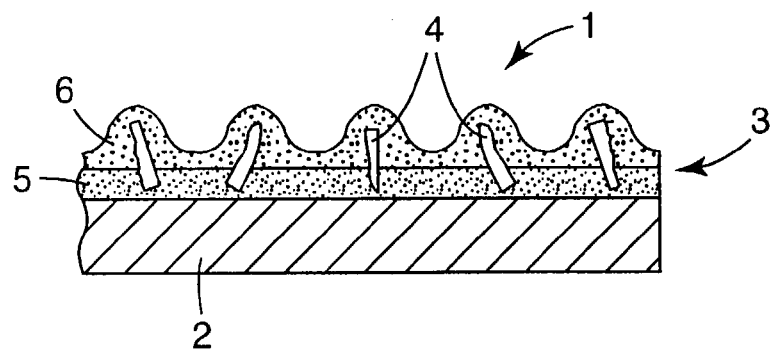
FIG. 1 is a fragmentary cross-sectional schematic view of a coated abrasive article including abrasive particles according to the present invention.

The present invention pertains to a novel $Al_2O_3$—$La_2O_3$—$Y_2O_3$—MgO glasses and glass-ceramics, and methods for making the same. The glasses are prepared by selecting the necessary raw materials and processing techniques.

Sources, including commercial sources, of (on a theoretical oxide basis) $Al_2O_3$ include bauxite (including both natural occurring bauxite and synthetically produced bauxite), calcined bauxite, hydrated aluminas (e.g., boehmite, and gibbsite), aluminum, Bayer process alumina, aluminum ore, gamma alumina, alpha alumina, aluminum salts, aluminum nitrates, and combinations thereof. The $Al_2O_3$ source may contain, or only provide, $Al_2O_3$. Alternatively, the $Al_2O_3$ source may contain, or provide $Al_2O_3$, as well as one or more metal oxides other than $Al_2O_3$ (including materials of or containing complex $Al_2O_3$·metal oxides (e.g., $Dy_3Al_5O_{12}$, $Y_3Al_5O_{12}$, $CeAl_{11}O_{18}$, etc.)).

Sources, including commercial sources, of (on a theoretical oxide basis) $La_2O_3$ include lanthanum oxide powders, lanthanum metal, lanthanum-containing ores, lanthanum salts, lanthanum nitrates, and lanthanum carbonates. The lanthanum oxide(s) source may contain, or provide lanthanum oxide(s), as well as one or more metal oxides other than lanthanum oxide(s) (including materials of or containing complex $La_2O_3$.other metal oxides).

Sources, including commercial sources, of (on a theoretical oxide basis) $Y_2O_3$ include yttrium oxide powders, yttrium, yttrium-containing ores, and yttrium salts (e.g., yttrium carbonates, nitrates, chlorides, hydroxides, and combinations thereof). The $Y_2O_3$ source may contain, or only provide, $Y_2O_3$. The $Y_2O_3$ source may contain, or provide $Y_2O_3$, as well as one or more metal oxides other than $Y_2O_3$ (including materials of or containing complex $Y_2O_3$·metal oxides (e.g., $Y_3Al_5O_{12}$)).

Sources, including commercial sources, of MgO include magnesium oxide powders, magnesium, magnesium-containing ores, and magnesium salts (e.g., magnesium carbonates, nitrates, chlorides, hydroxides, and combinations thereof). The MgO source may contain, or only provide, MgO. The MgO source may contain, or provide MgO, as well as one or more metal oxides other than MgO (including materials of or containing complex MgO·metal oxides (e.g., $MgAl_2O_4$)).

Sources, including commercial sources, of rare earth oxides include rare earth oxide powders, rare earth metals, rare earth-containing ores (e.g., bastnasite and monazite), rare earth salts, rare earth nitrates, and rare earth carbonates. The rare earth oxide(s) source may contain, or only provide, rare earth oxide(s). The rare earth oxide(s) source may contain, or provide rare earth oxide(s), as well as one or more metal oxides other than rare earth oxide(s) (including materials of or containing complex rare earth oxide-other metal oxides (e.g., $Dy_3Al_5O_{12}$, $CeAl_{11}O_{18}$, etc.)).

Other useful metal oxide may also include, on a theoretical oxide basis, BaO, CaO, $Cr_2O_3$, CoO, $Fe_2O_3$, $GeO_2$, $HfO_2$, $Li_2O$, MnO, NiO, $Na_2O$, $Sc_2O_3$, SrO, $TiO_2$, ZnO, $ZrO_2$, and combinations thereof. Sources, including commercial sources, include the oxides themselves, metal powders, complex oxides, ores, carbonates, acetates, nitrates, chlorides, hydroxides, etc. These metal oxides are added to modify a physical property of the resulting ceramic and/or improve processing. These metal oxides are typically are added anywhere from 0 to 50% by weight, in some embodiments 0 to 25% by weight, or even, 0 to 50% by weight of the ceramic material depending, for example, upon the desired property.

Sources, including commercial sources, of (on a theoretical oxide basis) $ZrO_2$ include zirconium oxide powders, zircon sand, zirconium, zirconium-containing ores, and zirconium salts (e.g., zirconium carbonates, acetates, nitrates, chlorides, hydroxides, and combinations thereof). In addition, or alternatively, the $ZrO_2$ source may contain, or provide $ZrO_2$, as well as other metal oxides such as hafnia. Sources, including commercial sources, of (on a theoretical oxide basis) $HfO_2$ include hafnium oxide powders, hafnium, hafnium-containing ores, and hafnium salts. In addition, or alternatively, the $HfO_2$ source may contain, or provide $HfO_2$, as well as other metal oxides such as $ZrO_2$.

For embodiments comprising $ZrO_2$ and $HfO_2$, the weight ratio of $ZrO_2$:$HfO_2$ may be in a range of 1:zero (i.e., all $ZrO_2$; no $HfO_2$) to zero: 1, as well as, for example, at least about 99, 98, 97, 96, 95, 90, 85, 80, 75, 70, 65, 60, 55, 50, 45, 40, 35, 30, 25, 20, 15, 10, and 5 parts (by weight) $ZrO_2$ and a corresponding amount of $HfO_2$ (e.g., at least about 99 parts (by weight) $ZrO_2$ and not greater than about 1 part $HfO_2$) and at least about 99, 98, 97, 96, 95, 90, 85, 80, 75, 70, 65, 60, 55, 50, 45, 40, 35, 30, 25, 20, 15, 10, and 5 parts $HfO_2$ and a corresponding amount of $ZrO_2$.

In some embodiments, it may be advantageous for at least a portion of a metal oxide source (in some embodiments, 10, 15, 20, 25, 30, 35, 40, 45, 50, 55, 60, 65, 70, 75, 80, 85, 90, 95, or even 100 percent by weight) to be obtained by adding particulate, metallic material comprising at least one of a metal (e.g., Al, Ca, Cu, Cr, Fe, Li, Mg, Ni, Ag, Ti, Zr, and combinations thereof), M, that has a negative enthalpy of oxide formation or an alloy thereof to the melt, or otherwise combining them with the other raw materials. Although not wanting to be bound by theory, it is believed that the heat resulting from the exothermic reaction associated with the oxidation of the metal is beneficial in the formation of a homogeneous melt and resulting glass. For example, it is believed that the additional heat generated by the oxidation reaction within the raw material eliminates or minimizes insufficient heat transfer, and hence facilitates formation and homogeneity of the melt, particularly when forming glass particles with x, y, and z dimensions over 50 (over 100, or even over 150) micrometers. It is also believed that the availability of the additional heat aids in driving various chemical reactions and physical processes (e.g., densification, and spherodization) to completion. Further, it is believed for some embodiments, the presence of the additional heat generated by the oxidation reaction actually enables the formation of a melt, which otherwise is difficult or otherwise not practical due to high melting point of the materials. Further, the presence of the additional heat generated by the oxidation reaction actually enables the formation of glass that otherwise could not be made, or could not be made in the desired size range. Another advantage of the invention include, in forming the glasses, that many of the chemical and physical processes such as melting, densification and spherodizing can be achieved in a short time, so that very high quench rates may be achieved. For additional details, see co-pending application having U.S. Ser. No. 10/211,639, filed the Aug. 2, 2002, the disclosure of which is incorporated herein by reference.

In one aspect of the invention, the raw materials are fed independently to form the molten mixture. In another aspect of the invention, certain raw materials are mixed together, while other raw materials are added independently into the molten mixture. In some embodiments, for example, the raw materials are combined or mixed together prior to melting. The raw materials may be combined in any suitable and known manner to form a substantially homogeneous mixture. These combining techniques include ball milling, mixing, tumbling and the like. The milling media in the ball mill may be metal balls, ceramic balls and the like. The ceramic milling media may be, for example, alumina, zirconia, silica, magnesia and the like. The ball milling may occur dry, in an aqueous environment, or in a solvent-based (e.g., isopropyl alcohol) environment. If the raw material batch contains metal powders, then it is generally desired to use a solvent during milling. This solvent may be any suitable material with the appropriate flash point and ability to disperse the raw materials. The milling time may be from a few minutes to a few days, generally between a few hours to 24 hours. In a wet or solvent based milling system, the liquid medium is removed, typically by drying, so that the resulting mixture is typically homogeneous and substantially devoid of the water and/or solvent. If a solvent based milling system is used, during drying, a solvent recovery system may be employed to recycle the solvent. After drying, the resulting mixture may be in the form of a "dried cake". This cake like mixture may then be broken up or crushed into the desired particle size prior to melting. Alternatively, for example, spray-drying techniques may be used. The latter typically provides spherical particulates of a desired oxide mixture. The precursor material may also be prepared by wet chemical methods including precipitation and sol-gel. Such methods will be beneficial if extremely high levels of homogeneity are desired.

Particulate raw materials are typically selected to have particle sizes such that the formation of a homogeneous melt can be achieved rapidly. Typically, raw materials with relatively small average particle sizes and narrow distributions are used for this purpose. In some methods (e.g., flame forming and plasma spraying), particularly desirable particulate raw materials are those having an average particle size in a range from about 5 nm to about 50 micrometers (in some embodiments, in a range from about 10 nm to about 20 micrometers, or even about 15 nm to about 1 micrometer), wherein at least 90 (in some embodiments, 95, or even 100) percent by weight of the particulate, although sizes outside of the sizes and ranges may also be useful. Particulate less than about 5 nm in size tends to be difficult to handle (e.g., the flow properties of the feed particles tended to be undesirable as they tend to have poor flow properties). Use of particulate larger than about 50 micrometers in typical flame forming or plasma spraying processes tend to make it more difficult to obtain homogenous melts and amorphous materials and/or the desired composition.

Furthermore, in some cases, for example, when particulate material is fed in to a flame or thermal or plasma spray apparatus, to form the melt, it may be desirable for the particulate raw materials to be provided in a range of particle sizes. Although not wanting to be bound by theory, it is believed that this maximizes the packing density and strength of the feed particles. In general the coarsest raw material particles are smaller than the desired melt or glass particle sizes. Further, raw material particles that are too coarse, tend to have insufficient thermal and mechanical stresses in the feed particles, for example, during a flame forming or plasma spraying step. The end result in such cases is generally, fracturing of the feed particles in to smaller fragments, loss of compositional uniformity, loss of yield in desired glass particle sizes, or even incomplete melting as the fragments generally change their trajectories in a multitude of directions out of the heat source.

The glasses and ceramics comprising glass can be made, for example, by heating (including in a flame or plasma) the appropriate metal oxide sources to form a melt, desirably a homogenous melt, and then rapidly cooling the melt to provide glass. Some embodiments of glasses can be made, for example, by melting the metal oxide sources in any suitable furnace (e.g., an inductively or resistively heated furnace, a gas-fired furnace, or an electrical furnace).

The glass is typically obtained by relatively rapidly cooling the molten material (i.e., the melt). The quench rate (i.e., the cooling time) to obtain the glass depends upon many factors, including the chemical composition of the melt, the glass-forming ability of the components, the thermal properties of the melt and the resulting glass, the processing technique(s), the dimensions and mass of the resulting glass, and the cooling technique. In general, relatively higher quench rates are required to form glasses comprising higher amounts of $Al_2O_3$ (i.e., greater than 75 percent by weight $Al_2O_3$), especially in the absence of known glass formers such as $SiO_2$, $B_2O_3$, $P_2O_5$, $GeO_2$, $TeO_2$, $As_2O_3$, and $V_2O_5$. Similarly, it is more difficult to cool melts into glasses in larger dimensions, as it is more difficult to remove heat fast enough.

In some embodiments of the invention, the raw materials are heated into a molten state in a particulate form and subsequently cooled into glass particles. Typically, the particles have a particle size greater than 25 micrometers (in some embodiments, greater than 50, 100, 150 or even 200 micrometers).

The quench rates achieved in making the glasses according to the invention are believed to be higher than $10^3$, $10^4$, $10^5$ or even $10^{6\circ}$ C./sec (i.e., a temperature drop of 1000° C. from a molten state in less than a second, less than a tenth of a second, less than a hundredth of a second or even less than a thousandth of a second, respectively). Techniques for cooling the melt include discharging the melt into a cooling media (e.g., high velocity air jets, liquids (e.g., cold water), metal plates (including chilled metal plates), metal rolls (including chilled metal rolls), metal balls (including chilled metal balls), and the like). Other cooling techniques known in the art include roll-chilling. Roll-chilling can be carried out, for example, by melting the metal oxide sources at a temperature typically 20–200° C. higher than the melting point, and cooling/quenching the melt by spraying it under high pressure (e.g., using a gas such as air, argon, nitrogen or the like) onto a high-speed rotary roll(s). Typically, the rolls are made of metal and are water-cooled. Metal book molds may also be useful for cooling/quenching the melt.

The cooling rate is believed to affect the properties of the quenched glass. For instance, glass transition temperature, density and other properties of glass typically change with cooling rates.

Rapid cooling may also be conducted under controlled atmospheres, such as a reducing, neutral, or oxidizing environment to maintain and/or influence the desired oxidation states, etc. during cooling. The atmosphere can also influence glass formation by influencing crystallization kinetics from undercooled liquid. For example, larger undercooling of $Al_2O_3$ melts without crystallization has been reported in argon atmosphere as compared to that in air.

In one method, glasses and ceramics comprising glass according to the present invention can be made utilizing flame fusion as disclosed, for example, in U.S. Pat. No. 6,254,981 (Castle), the disclosure of which is incorporated herein by reference. In this method, the metal oxide sources are fed (e.g., in the form of particles, sometimes referred to as "feed particles") directly into a burner (e.g., a methane-air burner, an acetylene-oxygen burner, a hydrogen-oxygen burner, and like), and then quenched, for example, in water, cooling oil, air, or the like. The size of feed particles fed into the flame generally determine the size of the resulting particles comprising glass.

Some embodiments of glasses can also be obtained by other techniques, such as: laser spin melt with free fall cooling, Taylor wire technique, plasmatron technique, hammer and anvil technique, centrifugal quenching, air gun splat cooling, single roller and twin roller quenching, roller-plate quenching and pendant drop melt extraction (see, e.g., *Rapid Solidification of Ceramics*, Brockway et. al., Metals And Ceramics Information Center, A Department of Defense Information Analysis Center, Columbus, Ohio, January, 1984, the disclosure of which is incorporated here as a reference). Some embodiments of glasses may also be obtained by other techniques, such as: thermal (including flame or laser or plasma-assisted) pyrolysis of suitable precursors, physical vapor synthesis (PVS) of metal precursors and mechanochemical processing.

Other techniques for forming melts, cooling/quenching melts, and/or otherwise forming glass include vapor phase quenching, plasma spraying, melt-extraction, and gas or centrifugal atomization. Vapor phase quenching can be carried out, for example, by sputtering, wherein the metal alloys or metal oxide sources are formed into a sputtering target(s). The target is fixed at a predetermined position in a sputtering apparatus, and a substrate(s) to be coated is placed at a position opposing the target(s). Typical pressures of $10^{-3}$ torr of oxygen gas and Ar gas, discharge is generated between the target(s) and a substrate(s), and Ar or oxygen ions collide against the target to start reaction sputtering, thereby depositing a film of composition on the substrate. For additional details regarding plasma spraying, see, for example, co-pending application having U.S. Ser. No. 10/211,640, filed Aug. 2, 2002, the disclosure of which is incorporated herein by reference.

Gas atomization involves melting feed particles to convert them to melt. A thin stream of such melt is atomized through contact with a disruptive air jet (i.e., the stream is divided into fine droplets). The resulting substantially discrete, generally ellipsoidal glass particles (e.g., beads) are then recovered. Examples of bead sizes include those having a diameter in a range of about 5 micrometers to about 3 mm. Melt-extraction can be carried out, for example, as disclosed in U.S. Pat. No. 5,605,870 (Strom-Olsen et al.), the disclosure of which is incorporated herein by reference. Containerless glass forming techniques utilizing laser beam heating as disclosed, for example, in U.S. Pat. No. 6,482,758 (Weber), the disclosure of which is incorporated herein by reference, may also be useful in making glass according to the present invention.

Typically, glasses and the glass-ceramics according to the present invention have x, y, and z dimensions each perpendicular to each other, and wherein each of the x, y, and z dimensions is at least 10 micrometers. In some embodiments, the x, y, and z dimensions is at least 30 micrometers, 35 micrometers, 40 micrometers, 45 micrometers, 50 micrometers, 75 micrometers, 100 micrometers, 150 micrometers, 200 micrometers, 250 micrometers, 500 micrometers, 1000 micrometers, 2000 micrometers, 2500 micrometers, 1 mm, 5 mm, or even at least 10 mm, if coalesced. The x, y, and z dimensions of a material are determined either visually or using microscopy, depending on the magnitude of the dimensions. The reported z dimension is, for example, the diameter of a sphere, the thickness of a coating, or the shortest dimension of a prismatic shape.

The addition of certain metal oxides may alter the properties and/or crystalline structure or microstructure of ceramics according to the present invention, as well as the processing of the raw materials and intermediates in making the ceramic. For example, oxide additions such as CaO, $Li_2O$, MgO, and $Na_2O$ have been observed to alter both the $T_g$ and $T_x$ (wherein $T_x$ is the crystallization temperature) of glass. Although not wishing to be bound by theory, it is believed that such additions influence glass formation. Further, for example, such oxide additions may decrease the melting temperature of the overall system (i.e., drive the system toward lower melting eutectic), and ease of glass-formation. Complex eutectics in multi component systems (quaternary, etc.) may result in better glass-forming ability. The viscosity of the liquid melt and viscosity of the glass in its "working" range may also be affected by the addition of metal oxides other than the particular required oxide(s).

Crystallization of glasses and ceramics comprising the glass to form glass-ceramics may also be affected by the additions of materials. For example, certain metals, metal oxides (e.g., titanates and zirconates), and fluorides may act as nucleation agents resulting in beneficial heterogeneous nucleation of crystals. Also, addition of some oxides may change the nature of metastable phases devitrifying from the glass upon reheating. In another aspect, for ceramics according to the present invention comprising crystalline $ZrO_2$, it may be desirable to add metal oxides (e.g., $Y_2O_3$, $TiO_2$, $CeO_2$, CaO, and MgO) that are known to stabilize tetragonal/cubic form of $ZrO_2$.

The particular selection of metal oxide sources and other additives for making ceramics according to the present invention typically takes into account, for example, the desired composition, the microstructure, the degree of crystallinity, the physical properties (e.g., hardness or toughness), the presence of undesirable impurities, and the desired or required characteristics of the particular process (including equipment and any purification of the raw materials before and/or during fusion and/or solidification) being used to prepare the ceramics.

In some instances, it may be desirable to incorporate limited amounts of metal oxides selected from the group consisting of: $Na_2O$, $P_2O_5$, $SiO_2$, $TeO_2$, $V_2O_3$, and combinations thereof. Sources, including commercial sources, include the oxides themselves, complex oxides, elemental (e.g., Si) powders, ores, carbonates, acetates, nitrates, chlorides, hydroxides, etc. These metal oxides may be added, for example, to modify a physical property of the resulting glass-ceramic and/or improve processing. These metal oxides when used are typically are added from greater than 0 to 20% by weight collectively (in some embodiments, greater than 0 to 5% by weight collectively, or even greater than 0 to 2% by weight collectively) of the glass-ceramic depending, for example, upon the desired property.

The microstructure or phase composition (glassy/crystalline) of a material can be determined in a number of ways. Various information can be obtained using optical microscopy, electron microscopy, differential thermal analysis (DTA), and x-ray diffraction (XRD), for example.

Using optical microscopy, amorphous material is typically predominantly transparent due to the lack of light scattering centers such as crystal boundaries, while crystalline material shows a crystalline structure and is opaque due to light scattering effects.

A percent amorphous (or glass) yield can be calculated for particles (e.g., beads), etc. using a −100+120 mesh size fraction (i.e., the fraction collected between 150-micrometer opening size and 125-micrometer opening size screens). The measurements are done in the following manner. A single layer of particles, beads, etc. is spread out upon a glass slide. The particles, beads, etc. are observed using an optical microscope. Using the crosshairs in the optical microscope eyepiece as a guide, particles, beads, etc. that lay along a straight line are counted either amorphous or crystalline depending on their optical clarity. A total of 500 particles, beads, etc. are typically counted, although fewer particles, beads, etc. may be used and a percent amorphous yield is determined by the amount of amorphous particles, beads, etc. divided by total particles, beads, etc. counted. Embodiments of methods according to the have percent amorphous (or glass) yields of at least 50, 60, 70, 75, 80, 85, 90, 95, or even 100 percent.

If it is desired for all the particles to be amorphous (or glass), and the resulting yield is less than 100%, the amorphous (or glass) particles may be separated from the non-amorphous (or non-glass) particles. Such separation may be done, for example, by any conventional techniques, including separating based upon density or optical clarity.

Using DTA, the material is classified as amorphous if the corresponding DTA trace of the material contains an exothermic crystallization event ($T_x$). If the same trace also contains an endotherinic event ($T_g$) at a temperature lower than $T_x$ it is considered to consist of a glass phase. If the DTA trace of the material contains no such events, it is considered to contain crystalline phases.

Differential thermal analysis (DTA) can be conducted using the following method. DTA runs can be made (using an instrument such as that obtained from Netzsch Instruments, Selb, Germany under the trade designation "NETZSCH STA 409 DTA/TGA") using a −140+170 mesh size fraction (i.e., the fraction collected between 105-micrometer opening size and 90-micrometer opening size screens). An amount of each screened sample (typically about 400 milligrams (mg)) is placed in a 100-microliter $Al_2O_3$ sample holder. Each sample is heated in static air at a rate of 10° C./minute from room temperature (about 25° C.) to 1100° C.

Using powder x-ray diffraction, XRD, (using an x-ray diffractometer such as that obtained under the trade designation "PHILLIPS XRG 3100" from Phillips, Mahwah, N.J., with copper K α1 radiation of 1.54050 Angstrom) the phases present in a material can be determined by comparing the peaks present in the XRD trace of the crystallized material to XRD patterns of crystalline phases provided in JCPDS (Joint Committee on Powder Diffraction Standards) databases, published by International Center for Diffraction Data. Furthermore, XRD can be used qualitatively to determine types of phases. The presence of a broad diffused intensity peak is taken as an indication of the amorphous nature of a material. The existence of both a broad peak and well-defined peaks is taken as an indication of existence of crystalline matter within a glass matrix.

The initially formed glass or ceramic (including glass prior to crystallization) may be larger in size than that desired. If the glass is in a desired geometric shape and/or size, size reduction is typically not needed. The glass or ceramic can be converted into smaller pieces using crushing and/or comminuting techniques known in the art, including roll crushing, canary milling, jaw crushing, hammer milling, ball milling, jet milling, impact crushing, and the like. In some instances, it is desired to have two or multiple crushing steps. For example, after the ceramic is formed (solidified), it may be in the form of larger than desired. The first crushing step may involve crushing these relatively large masses or "chunks" to form smaller pieces. This crushing of these chunks may be accomplished with a hammer mill, impact crusher or jaw crusher. These smaller pieces may then be subsequently crushed to produce the desired particle size distribution. In order to produce the desired particle size distribution (sometimes referred to as grit size or grade), it may be necessary to perform multiple crushing steps. In general the crushing conditions are optimized to achieve the desired particle shape(s) and particle size distribution. Resulting particles that are not of the desired size may be re-crushed if they are too large, or "recycled" and used as a raw material for re-melting if they are too small.

The shape of particles can depend, for example, on the composition and/or microstructure of the ceramic, the geometry in which it was cooled, and the manner in which the ceramic is crushed (i.e., the crushing technique used). In general, where a "blocky" shape is preferred, more energy may be employed to achieve this shape. Conversely, where a "sharp" shape is preferred, less energy may be employed to achieve this shape. The crushing technique may also be changed to achieve different desired shapes. For some particles an average aspect ratio ranging from 1:1 to 5:1 is typically desired, and in some embodiments 1.25:1 to 3:1, or even 1.5:1 to 2.5:1.

It is also within the scope of the present invention, for example, to directly form articles in desired shapes. For example, desired articles may be formed (including molded) by pouring or forming the melt into a mold. Also see, for example, the forming techniques described in application having U.S. Ser. No. 10/358,772 filed the same date as the instant application, the disclosure of which is incorporated herein by reference.

Embodiments of ceramics according to the present invention can be obtained without limitations in dimensions. This was found to be possible through a coalescing step performed at temperatures above glass transition temperature. This coalescing step in essence forms a larger sized body from two or more smaller particles. For instance, as evident from FIG. 4, glass according to the present invention undergoes glass transition ($T_g$) before significant crystallization occurs ($T_x$) as evidenced by the existence of an endotherm ($T_g$) at lower temperature than an exotherm ($T_x$). For example, ceramic (including glass prior to crystallization), may also be provided by heating, for example, particles comprising the glass, and/or fibers, etc. above the $T_g$ such that the particles, etc. coalesce to form a shape and cooling the coalesced shape. The temperature and pressure used for coalescing may depend, for example, upon composition of the glass and the desired density of the resulting material. The temperature should be greater than the glass transition temperature. In certain embodiments, the heating is conducted at at least one temperature in a range of about 850° C. to about 1100° C. (in some embodiments, 900° C. to 1000° C.). Typically, the glass is under pressure (e.g., greater than zero to 1 GPa or more) during coalescence to aid the coalescence of the glass. In one embodiment, a charge of the particles, etc. is placed into a die and hot-pressing is performed at temperatures above glass transition where viscous flow of glass leads to coalescence into a relatively large part. Examples of typical coalescing techniques include hot pressing, hot isostatic pressing, hot extrusion, hot forging and the like (e.g., sintering, plasma assisted sintering). For example, particles comprising glass (obtained, for example, by crushing) (including beads and microspheres), fibers, etc. may formed into a larger particle size. Coalescing may also result in a body shaped into a desired form. Typically, it is generally desirable to cool the resulting coalesced body before further heat treatment. After heat treatment if so desired, the coalesced body may be crushed to smaller particle sizes or a desired particle size distribution.

Coalescing of the glass and/or glass-ceramic (e.g., particles) may also be accomplished by a variety of methods, including pressure-less or pressure sintering.

In general, heat-treatment can be carried out in any of a variety of ways, including those known in the art for heat-treating glass to provide glass-ceramics. For example, heat-treatment can be conducted in batches, for example, using resistive, inductively or gas heated furnaces. Alternatively, for example, heat-treatment (or a portion thereof) can be conducted continuously, for example, using a rotary kiln, fluidized bed furnaces, or pendulum kiln. In the case of a rotary kiln or a pendulum kiln, the material is typically fed directly into the kiln operating at the elevated temperature. In the case of a fluidized bed furnace, the glass to be heat-treated is typically suspended in a gas (e.g., air, inert, or reducing gasses). The time at the elevated temperature may range from a few seconds (in some embodiments even less than 5 seconds) to a few minutes to several hours. The temperature typically ranges from the $T_x$ of the glass to 1600° C., more typically from 900° C. to 1600° C., and in some embodiments, from 1200° C. to 1500° C. It is also within the scope of the present invention to perform some of the heat-treatment in multiple steps (e.g., one for nucleation, and another for crystal growth; wherein densification also typically occurs during the crystal growth step). When a multiple step heat-treatment is carried out, it is typically desired to control either or both the nucleation and the crystal growth rates. In general, during most ceramic processing operations, it is desired to obtain maximum densification without significant crystal growth. Although not wanting to be bound by theory, in general, it is believed in the ceramic art that larger crystal sizes lead to reduced mechanical properties while finer average crystallite sizes lead to improved mechanical properties (e.g., higher strength and higher hardness). In particular, it is very desirable to form ceramics with densities of at least 90, 95, 97, 98, 99, or even at least 100 percent of theoretical density, wherein the average crystal sizes are less than 0.15 micrometer, or even less than 0.1 micrometer.

In some embodiments of the present invention, glass or ceramics comprising glass may be annealed prior to heat-treatment. In such cases annealing is typically done at a temperature less than the $T_x$ of the glass for a time from a few second to few hours or even days. Typically, the annealing is done for a period of less than 3 hours, or even less than an hour. Optionally, annealing may also be carried out in atmospheres other than air. Furthermore, different stages (i.e., the nucleation step and the crystal growth step) of the heat-treatment may be carried out under different atmospheres. It is believed that the $T_g$ and $T_x$, as well as the $T_x-T_g$ of glasses according to this invention may shift depending on the atmospheres used during the heat treatment.

One skilled in the art can determine the appropriate conditions from a Time-Temperature-Transformation (TTT) study of the glass using techniques known in the art. One skilled in the art, after reading the disclosure of the present invention should be able to provide TTT curves for glasses used to make glass-ceramics according to the present invention, determine the appropriate nucleation and/or crystal growth conditions to provide glass-ceramics according to the present invention.

Heat-treatment may occur, for example, by feeding the material directly into a furnace at the elevated temperature. Alternatively, for example, the material may be fed into a furnace at a much lower temperature (e.g., room temperature) and then heated to desired temperature at a predetermined heating rate. It is within the scope of the present invention to conduct heat-treatment in an atmosphere other than air. In some cases it might be even desirable to heat-treat in a reducing atmosphere(s). Also, for, example, it may be desirable to heat-treat under gas pressure as in, for example, hot-isostatic press, or in gas pressure furnace. Although not wanting to be bound by theory, it is believed that atmospheres may affect oxidation states of some of the components of the amorphous materials and glass-ceramics. Such variation in oxidation state can bring about varying coloration of glass and glass-ceramics. In addition, nucleation and crystallization steps can be affected by atmospheres (e.g., the atmosphere may affect the atomic mobilities of some species of the glass).

It is also within the scope of the present invention to conduct additional heat-treatment to further improve desirable properties of the material. For example, hot-isostatic pressing may be conducted (e.g., at temperatures from about 900° C. to about 1400° C.) to remove residual porosity, increasing the density of the material.

It is within the scope of the present invention to convert (e.g., crush) the resulting article or heat-treated article to provide particles (e.g., abrasive particles according to the present invention).

Typically, glass-ceramics are stronger than the glasses from which they are formed. Hence, the strength of the material may be adjusted, for example, by the degree to which the glass is converted to crystalline ceramic phase(s). Alternatively, or in addition, the strength of the material may also be affected, for example, by the number of nucleation sites created, which may in turn be used to affect the number, and in turn the size of the crystals of the crystalline phase(s). For additional details regarding forming glass-ceramics, see, for example, Glass-Ceramics, P. W. McMillan, Academic Press, Inc., $2^{nd}$ edition, 1979, the disclosure of which is incorporated herein by reference.

As compared to many other types of ceramic processing (e.g., sintering of a calcined material to a dense, sintered ceramic material), there is relatively little shrinkage (typically, less than 30 percent by volume; in some embodiments, less than 20 percent, 10 percent, 5 percent, or even less than 3 percent by volume) during crystallization of the glass to form the glass-ceramic. The actual amount of shrinkage depends, for example, on the composition of the glass, the heat-treatment time, the heat-treatment temperature, the heat-treatment pressure, the density of the glass being crystallized, the relative amount(s) of the crystalline phases formed, and the degree of crystallization. The amount of shrinkage can be measured by conventional techniques known in the art, including by dilatometry, archimedes method, or measuring the dimensions of the material before and after heat-treatment. In some cases, there may be some evolution of volatile species during heat-treatment.

In some embodiments, the relatively low shrinkage feature may be particularly advantageous. For example, articles may be formed in the glass phase to the desired shapes and dimensions (i.e., in near-net shape), followed by heat treatment to at least partially crystallize the glass. As a result, substantial cost savings associated with the manufacturing and machining of the crystallized material may be realized.

In some embodiments, the glass has an x, y, z direction, each of which has a length of at least 1 cm (in some embodiments, at least 5 cm, or even at least 10 cm), wherein the glass has a volume, wherein the resulting glass-ceramic has an x, y, z direction, each of which has a length of at least 1 cm (in some embodiments, at least 5 cm, or even at least 10 cm), wherein the glass-ceramic has a volume of at least 70 (in some embodiments, at least 75, 80, 85, 90, 95, 96, or even at least 97) percent of the glass volume.

For example, during heat-treatment of some exemplary glasses for making glass-ceramics according to present invention, formation of phases such as $La_2Zr_2O_7$, and, if $ZrO_2$ is present, cubic/tetragonal $ZrO_2$, in some cases monoclinic $ZrO_2$, may occur at temperatures above about 900° C. Although not wanting to be bound by theory, it is believed that zirconia-related phases are the first phases to nucleate from the glass. Formation of $Al_2O_3$, $ReAlO_3$ (wherein Re is at least one rare earth cation), $ReAl_{11}O_{18}$, $Re_3Al_5O_{12}$, $Y_3Al_5O_{12}$, etc. phases are believed to generally occur at temperatures above about 925° C. Typically, crystallite size during this nucleation step is on order of nanometers. For example, crystals as small as 10–15 nanometers have been observed. For at least some embodiments, heat-treatment at about 1300° C. for about 1 hour provides a full crystallization. In generally, heat-treatment times for each of the nucleation and crystal growth steps may range of a few seconds (in some embodiments even less than 5 seconds) to several minutes to an hour or more.

The average crystal size can be determined by the line intercept method according to the ASTM standard E 112-96 "Standard Test Methods for Determining Average Grain Size". The sample is mounted in mounting resin (such as that obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The mounted and polished sample is sputtered with a thin layer of gold-palladium and viewed using a scanning electron microscopy (such as Model JSM 840A from JEOL, Peabody, Mass.). A typical back-scattered electron (BSE) digital micrograph of the microstructure found in the sample is used to determine the average crystallite size as follows. The number of crystallites that intersect per unit length (NL) of a random straight line drawn across the digital micrograph are counted. The average crystallite size is determined from this number using the following equation.

$$\text{Average Crystallite Size} = \frac{1.5}{N_L M},$$

where $N_L$ is the number of crystallites intersected per unit length and M is the magnification of the digital micrograph.

In another aspect, ceramics (including glass-ceramics) according to the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 1 micrometer. In another aspect, ceramics (including glass-ceramics) according to the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.5 micrometer. In another aspect, ceramics (including glass-ceramics) according to the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.3 micrometer. In another aspect, ceramics (including glass-ceramics) according to the present invention may comprise at least 1, 2, 3, 5, 10, 15, 20, 25, 30, 35, 40, 45, 50, 55, 60, 65, 70, 75, 80, 85, 90, 95, 97, 98, 99, or even 100 percent by volume crystallites, wherein the crystallites have an average size of less than 0.15 micrometer.

Examples of crystalline phases which may be present in ceramics according to the present invention include: alumina (e.g., alpha and transition aluminas), REO (e.g., $La_2O_3$), $Y_2O_3$, MgO, one or more other metal oxides such as BaO, CaO, $Cr_2O_3$, CoO, $Fe_2O_3$, $GeO_2$, $Li_2O$, MnO, NiO, $Na_2O$, $P_2O_5$, $Sc_2O_3$, $SiO_2$, SrO, $TeO_2$, $TiO_2$, $V_2O_3$, ZnO, $HfO_2$, $ZrO_2$ (e.g., cubic $ZrO_2$ and tetragonal $ZrO_2$), as well as "complex metal oxides" (including complex $Al_2O_3$·metal oxide (e.g., complex $Al_2O_3$·REO)), complex $Al_2O_3$·metal oxide(s) (e.g., complex $Al_2O_3$·REO (e.g., $ReAlO_3$ (e.g., $GdAlO_3$ $LaAlO_3$), $ReAl_{11}O_{18}$ (e.g., $LaAl_{11}O_{18}$,), and $Re_3Al_5O_{12}$ (e.g., $Dy_3Al_5O_{12}$)), complex $Al_2O_3$·$Y_2O_3$ (e.g., $Y_3Al_5O_{12}$), and complex $ZrO_2$·REO (e.g., $La_2Zr_2O_7$)), and combinations thereof. Typically, ceramics according to the present invention are free of eutectic microstructure features.

For some embodiments of glasses and glass-ceramics according to the present invention, and some glasses used to make such glass-ceramics comprising $ZrO_2$ and/or $HfO_2$, the amount of $ZrO_2$ and/or $HfO_2$ present may be at least 5, 10, 15, or even at least 20 percent by weight, based on the total weight of the glass-ceramic or glass, respectively.

It is also with in the scope of the present invention to substitute a portion of the yttrium and/or aluminum cations in a complex $Al_2O_3$·metal oxide (e.g., complex $Al_2O_3$·REO and/or complex $Al_2O_3$·$Y_2O_3$ (e.g., yttrium aluminate exhibiting a garnet crystal structure)) with other cations. For example, a portion of the Al cations in a complex $Al_2O_3$·$Y_2O_3$ may be substituted with at least one cation of an element selected from the group consisting of: Cr, Ti, Sc, Fe, Mg, Ca, Si, Co, and combinations thereof. For example, a portion of the Y cations in a complex $Al_2O_3$·$Y_2O_3$ may be substituted with at least one cation of an element selected from the group consisting of: Ce, Dy, Er, Eu, Gd, Ho, La, Lu, Nd, Pr, Sm, Th, Tm, Yb, Fe, Ti, Mn, V, Cr, Co, Ni, Cu, Mg, Ca, Sr, and combinations thereof. Further for example, a portion of the Al cations in a complex $Al_2O_3$·REO may be substituted with at least one cation of an element selected from the group consisting of: Cr, Ti, Sc, Fe, Mg, Ca, Si, Co, and combinations thereof. For example, a portion of the rare earth cations in a complex $Al_2O_3$·REO may be substituted with at least one cation of an element selected from the group consisting of: Y, Fe, Ti, Mn, V, Cr, Co, Ni, Cu, Mg, Ca, Sr, and combinations thereof. The substitution of cations as described above may affect the properties (e.g. hardness, toughness, strength, thermal conductivity, etc.) of the ceramic.

Crystals formed by heat-treating amorphous to provide embodiments of glass-ceramics according to the present invention may be, for example, acicular equiaxed, columnar, or flattened splat-like features.

Some glass and glass-ceramics according to the present invention comprise at least 75 (in some embodiments at least 80, or even at least 85) percent by weight $Al_2O_3$, $La_2O_3$ in a range from 0.1 to 23.9 percent by weight, $Y_2O_3$ in a range from 1 to 24.8 percent by weight, MgO in a range from 0.1 to 8 percent by weight, and up to 10 (in some embodiments, not more than 5, 4, 3, 2, 1, or even zero) percent by weight $SiO_2$, based on the total weight of the glass or glass-ceramic, respectively.

Some glass and glass-ceramics according to the present invention comprise at least 70 (in some embodiments at least 75, or even at least 85) percent by weight $Al_2O_3$, $La_2O_3$ in a range from 0.1 to 28.9 percent by weight, $Y_2O_3$ in a range from 1 to 29.8 percent by weight, MgO in a range from 0.1 to 8 percent by weight, and up to 10 (in some embodiments, not more than 5, 4, 3, 2, 1, or even zero) percent by weight $SiO_2$, based on the total weight of the glass or glass-ceramic, respectively.

Although a glass or glass-ceramic, etc. according to the present invention may be in the form of a bulk material, it is Also within the scope of the present invention to provide composites comprising a glass, glass-ceramic, etc. according to the present invention. Such a composite may comprise, for example, a phase or fibers (continuous or discontinuous) or particles (including whiskers) (e.g., metal oxide particles, boride particles, carbide particles, nitride particles, diamond particles, metallic particles, glass particles, and combinations thereof) dispersed in a glass, glass-ceramic, etc. according to the present invention, invention or a layered-composite structure (e.g., a gradient of glass-ceramic to glass used to make the glass-ceramic and/or layers of different compositions of glass-ceramics).

Certain glasses according to the present invention may have, for example, a $T_g$ in a range of about 750° C. to about 950° C.

The average hardness of the material according to the present invention can be determined as follows. Sections of the material are mounted in mounting resin (obtained under the trade designation "TRANSOPTIC POWDER" from Buehler, Lake Bluff, Ill.) typically in a cylinder of resin about 2.5 cm in diameter and about 1.9 cm high. The mounted section is prepared using conventional polishing techniques using a polisher (such as that obtained from Buehler, Lake Bluff, Ill. under the trade designation "ECOMET 3"). The sample is polished for about 3 minutes with a diamond wheel, followed by 5 minutes of polishing with each of 45, 30, 15, 9, 3, and 1-micrometer slurries. The microhardness measurements are made using a conventional microhardness tester (such as that obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference. The average hardness is an average of 10 measurements.

Certain glasses according to the present invention may have, for example, an average hardness of at least 5 GPa (more desirably, at least 6 GPa, 7 GPa, 8 GPa, or 9 GPa; typically in a range of about 5 GPa to about 10 GPa), crystalline ceramics according to the present invention at least 5 GPa (more desirably, at least 6 GPa, 7 GPa, 8 GPa, 9 GPa, 10 GPa, 11 GPa, 12 GPa, 13 GPa, 14 GPa, 15 GPa, 16 GPa, 17 GPa, or 18 GPa; typically in a range of about 5 GPa to about 18 GPa), and glass-ceramics according to the present invention or ceramics according to the present invention comprising glass and crystalline ceramic at least 5 GPa (more desirably, at least 6 GPa, 7 GPa, 8 GPa, 9 GPa, 10 GPa, 11 GPa, 12 GPa, 13 GPa, 14 GPa, 15 GPa, 16 GPa, 17 GPa, or 18 GPa (or more); typically in a range of about 5 GPa to about 18 GPa). Abrasive particles according to the present invention have an average hardness of at least 15 GPa, in some embodiments, at least 16 GPa, at least 17 GPa, or even at least 18 GPa.

Certain glasses according to the present invention may have, for example, a thermal expansion coefficient in a range of about $5 \times 10^{-6}$/K to about $11 \times 10^{-6}$/K over a temperature range of at least 25° C. to about 900° C.

Typically, and desirably, the (true) density, sometimes referred to as specific gravity, of ceramic according to the present invention is typically at least 70% of theoretical density. More desirably, the (true) density of ceramic according to the present invention is at least 75%, 80%, 85%, 90%, 95%, 96%, 97%, 98%, 99%, 99.5% or even 100% of theoretical density. Abrasive particles according to the present invention have densities of at least 85%, 90%, 92%, 95%, 96%, 97%, 98%, 99%, 99.5% or even 100% of theoretical density.

Articles can be made using ceramics according to the present invention, for example, as a filler, reinforcement material, and/or matrix material. For example, ceramic according to the present invention can be in the form of particles and/or fibers suitable for use as reinforcing materials in composites (e.g., ceramic, metal, or polymeric (thermosetting or thermoplastic)). The particles and/or fibers may, for example, increase the modulus, heat resistance, wear resistance, and/or strength of the matrix material. Although the size, shape, and amount of the particles and/or fibers used to make a composite may depend, for example, on the particular matrix material and use of the composite, the size of the reinforcing particles typically range from about 0.1 to 1500 micrometers, more typically 1 to 500 micrometers, and desirably between 2 to 100 micrometers. The amount of particles for polymeric applications is typically about 0.5 percent to about 75 percent by weight, more typically about 1 to about 50 percent by weight. Examples of thermosetting polymers include: phenolic, melamine, urea formaldehyde, acrylate, epoxy, urethane polymers, and the like. Examples of thermoplastic polymers include: nylon, polyethylene, polypropylene, polyurethane, polyester, polyamides, and the like.

Examples of uses for reinforced polymeric materials (i.e., reinforcing particles according to the present invention dispersed in a polymer) include protective coatings, for example, for concrete, furniture, floors, roadways, wood, wood-like materials, ceramics, and the like, as well as, anti-skid coatings and injection molded plastic parts and components.

Further, for example, ceramic according to the present invention can be used as a matrix material. For example, ceramics according to the present invention can be used as a binder for ceramic materials and the like such as diamond, cubic-BN, $Al_2O_3$, $ZrO_2$, $Si_3N_4$, and SiC. Examples of useful articles comprising such materials include composite substrate coatings, cutting tool inserts abrasive agglomerates, and bonded abrasive articles such as vitrified wheels. The ceramics according to the present invention can be used as binders, for example, to increase the modulus, heat resistance, wear resistance, and/or strength of the composite article.

Abrasive particles according to the present invention generally comprise crystalline ceramic (e.g., at least 75, 80, 85, 90, 91, 92, 93, 94, 95, 96, 97, 98, 99, 99.5, or even 100 percent by volume crystalline ceramic). In another aspect, the present invention provides a plurality of particles having a particle size distribution ranging from fine to coarse, wherein at least a portion of the plurality of particles are abrasive particles according to the present invention. In another aspect, embodiments of abrasive particles according to the present invention generally comprise (e.g., at least 75, 80, 85, 90, 91, 92, 93, 94, 95, 96, 97, 98, 99, 99.5, or even 100 percent by volume) glass-ceramic according to the present invention.

Abrasive particles according to the present invention can be screened and graded using techniques well known in the art, including the use of industry recognized grading standards such as ANSI (American National Standard Institute), FEPA (Federation Europeenne des Fabricants de Products Abrasifs), and JIS (Japanese Industrial Standard). Abrasive particles according to the present invention may be used in a wide range of particle sizes, typically ranging in size from about 0.1 to about 5000 micrometers, more typically from about 1 to about 2000 micrometers; desirably from about 5 to about 1500 micrometers, more desirably from about 100 to about 1500 micrometers.

In a given particle size distribution, there will be a range of particle sizes, from coarse particles to fine particles. In the abrasive art this range is sometimes referred to as a "coarse", "control" and "fine" fractions. Abrasive particles graded according to industry accepted grading standards specify the particle size distribution for each nominal grade within numerical limits. Such industry accepted grading standards include those known as the American National Standards Institute, Inc. (ANSI) standards, Federation of European Producers of Abrasive Products (FEPA) standards, and Japanese Industrial Standard (JIS) standards. ANSI grade designations (i.e., specified nominal grades) include: ANSI 4, ANSI 6, ANSI 8, ANSI 16, ANSI 24, ANSI 36, ANSI 40, ANSI 50, ANSI 60, ANSI 80, ANSI 100, ANSI 120, ANSI 150, ANSI 180, ANSI 220, ANSI 240, ANSI 280, ANSI 320, ANSI 360, ANSI 400, and ANSI 600. FEPA grade designations include P8, P12, P16, P24, P36, P40, P50, P60, P80, P100, P120, P150, P180, P220, P320, P400, P500, P600, P800, P1000, and P1200. JIS grade designations include JIS8, JIS12, JIS16, JIS24, JIS36, JIS46, JIS54, JIS60, JIS80, JIS100, JIS150, JIS180, JIS220, JIS240, JIS280, JIS320, JIS360, JIS400, JIS600, JIS800, JIS1000, JIS1500, JIS2500, JIS4000, JIS6000, JIS8000, and JIS 10,000.

After crushing and screening, there will typically be a multitude of different abrasive particle size distributions or grades. These multitudes of grades may not match a manufacturer's or supplier's needs at that particular time. To minimize inventory, it is possible to recycle the off demand grades back into melt to form glass. This recycling may occur after the crushing step, where the particles are in large chunks or smaller pieces (sometimes referred to as "fines") that have not been screened to a particular distribution.

In another aspect, the present invention provides a method for making abrasive particles, the method comprising heat-treating glass particles or particles comprising glass according to the present invention to provide abrasive particles comprising a glass-ceramic according to the present invention. Alternatively, for example, the present invention provides a method for making abrasive particles, the method comprising heat-treating glass according to the present invention, and crushing the resulting heat-treated material to provide abrasive particles comprising a glass-ceramic according to the present invention. When crushed, glass tends to provide sharper particles than crushing significantly crystallized glass-ceramics or crystalline material.

In another aspect, the present invention provides agglomerate abrasive grains each comprising a plurality of abrasive particles according to the present invention bonded together via a binder. In another aspect, the present invention provides an abrasive article (e.g., coated abrasive articles, bonded abrasive articles (including vitrified, resinoid, and metal bonded grinding wheels, cutoff wheels, mounted points, and honing stones), nonwoven abrasive articles, and abrasive brushes) comprising a binder and a plurality of abrasive particles, wherein at least a portion of the abrasive particles are abrasive particles (including where the abrasive particles are agglomerated) according to the present invention. Methods of making such abrasive articles and using abrasive articles are well known to those skilled in the art. Furthermore, abrasive particles according to the present invention can be used in abrasive applications that utilize abrasive particles, such as slurries of abrading compounds (e.g., polishing compounds), milling media, shot blast media, vibratory mill media, and the like.

Coated abrasive articles generally include a backing, abrasive particles, and at least one binder to hold the abrasive particles onto the backing. The backing can be any suitable material, including cloth, polymeric film, fibre, nonwoven webs, paper, combinations thereof, and treated versions thereof. The binder can be any suitable binder, including an inorganic or organic binder (including thermally curable resins and radiation curable resins). The abrasive particles can be present in one layer or in two layers of the coated abrasive article.

An example of a coated abrasive article is depicted in FIG. 1. Referring to FIG. 1, coated abrasive article 1 has a backing (substrate) 2 and abrasive layer 3. Abrasive layer 3 includes abrasive particles according to the present invention 4 secured to a major surface of backing 2 by make coat 5 and size coat 6. In some instances, a supersize coat (not shown) is used.

Bonded abrasive articles typically include a shaped mass of abrasive particles held together by an organic, metallic, or vitrified binder. Such shaped mass can be, for example, in the form of a wheel, such as a grinding wheel or cutoff wheel. The diameter of grinding wheels typically is about 1 cm to over 1 meter; the diameter of cut off wheels about 1 cm to over 80 cm (more typically 3 cm to about 50 cm). The cut off wheel thickness is typically about 0.5 mm to about 5 cm, more typically about 0.5 mm to about 2 cm. The shaped mass can also be in the form, for example, of a honing stone, segment, mounted point, disc (e.g. double disc grinder) or other conventional bonded abrasive shape. Bonded abrasive articles typically comprise about 3–50% by volume bond material, about 30–90% by volume abrasive particles (or abrasive particle blends), up to 50% by volume additives (including grinding aids), and up to 70% by volume pores, based on the total volume of the bonded abrasive article.

Figure 2:
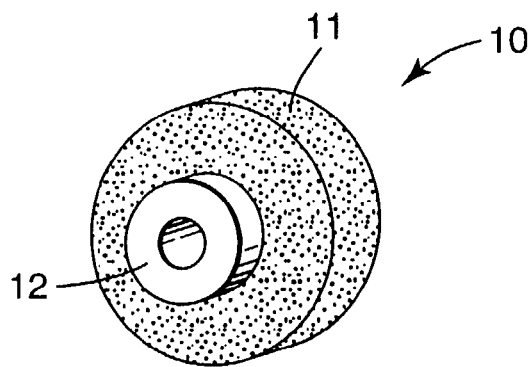
FIG. 2 is a perspective view of a bonded abrasive article including abrasive particles according to the present invention.

An exemplary grinding wheel is shown in FIG. 2. Referring to FIG. 2, grinding wheel 10 is depicted, which includes abrasive particles according to the present invention 11, molded in a wheel and mounted on hub 12.

Figure 3:
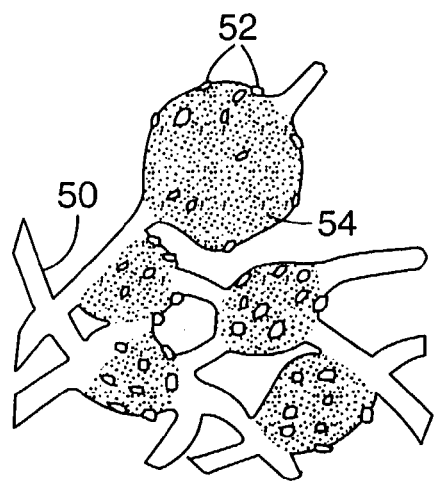
FIG. 3 is an enlarged schematic view of a nonwoven abrasive article including abrasive particles according to the present invention.

Nonwoven abrasive articles typically include an open porous lofty polymer filament structure having abrasive particles according to the present invention distributed throughout the structure and adherently bonded therein by an organic binder. Examples of filaments include polyester fibers, polyamide fibers, and polyaramid fibers. An exemplary nonwoven abrasive article is shown in FIG. 3. Referring to FIG. 3, a schematic depiction, enlarged about 100×, of a typical nonwoven abrasive article is shown, comprises fibrous mat 50 as a substrate, onto which abrasive particles according to the present invention 52 are adhered by binder 54.

Useful abrasive brushes include those having a plurality of bristles unitary with a backing (see, e.g., U.S. Pat. No. 5,427,595 (Pihl et al.), U.S. Pat. No. 5,443,906 (Pihl et al.), U.S. Pat. No. 5,679,067 (Johnson et al.), and U.S. Pat. No. 5,903,951 (Ionta et al.), the disclosure of which is incorporated herein by reference). Desirably, such brushes are made by injection molding a mixture of polymer and abrasive particles.

Suitable organic binders for making abrasive articles include thermosetting organic polymers. Examples of suitable thermosetting organic polymers include phenolic resins, urea-formaldehyde resins, melamine-formaldehyde resins, urethane resins, acrylate resins, polyester resins, aminoplast resins having pendant α,β-unsaturated carbonyl groups, epoxy resins, acrylated urethane, acrylated epoxies, and combinations thereof. The binder and/or abrasive article may also include additives such as fibers, lubricants, wetting agents, thixotropic materials, surfactants, pigments, dyes, antistatic agents (e.g., carbon black, vanadium oxide, graphite, etc.), coupling agents (e.g., silanes, titanates, zircoaluminates, etc.), plasticizers, suspending agents, and the like. The amounts of these optional additives are selected to provide the desired properties. The coupling agents can improve adhesion to the abrasive particles and/or filler. The binder chemistry may thermally cured, radiation cured or combinations thereof. Additional details on binder chemistry may be found in U.S. Pat. No. 4,588,419 (Caul et al.), U.S. Pat. No. 4,751,138 (Tumey et al.), and U.S. Pat. No. 5,436,063 (Follett et al.), the disclosures of which are incorporated herein by reference.

More specifically with regard to vitrified bonded abrasives, vitreous bonding materials, which exhibit an amorphous structure and are typically hard, are well known in the art. In some cases, the vitreous bonding material includes crystalline phases. Bonded, vitrified abrasive articles according to the present invention may be in the shape of a wheel (including cut off wheels), honing stone, mounted pointed or other conventional bonded abrasive shape. In some embodiments, a vitrified bonded abrasive article according to the present invention is in the form of a grinding wheel.

Examples of metal oxides that are used to form vitreous bonding materials include: silica, silicates, alumina, soda, calcia, potassia, titania, iron oxide, zinc oxide, lithium oxide, magnesia, boria, aluminum silicate, borosilicate glass, lithium aluminum silicate, combinations thereof, and the like. Typically, vitreous bonding materials can be formed from composition comprising from 10 to 100% glass frit, although more typically the composition comprises 20% to 80% glass frit, or 30% to 70% glass frit. The remaining portion of the vitreous bonding material can be a non-frit material. Alternatively, the vitreous bond may be derived from a non-frit containing composition. Vitreous bonding materials are typically matured at a temperature(s) in a range of about 700° C. to about 1500° C., usually in a range of about 800° C. to about 1300° C., sometimes in a range of about 900° C. to about 1200° C., or even in a range of about 950° C. to about 1100° C. The actual temperature at which the bond is matured depends, for example, on the particular bond chemistry.

In some embodiments, vitrified bonding materials include those comprising silica, alumina (desirably, at least 10 percent by weight alumina), and boria (desirably, at least 10 percent by weight boria). In most cases the vitrified bonding material further comprise alkali metal oxide(s) (e.g., $Na_2O$ and $K_2O$) (in some cases at least 10 percent by weight alkali metal oxide(s)).

Binder materials may also contain filler materials or grinding aids, typically in the form of a particulate material. Typically, the particulate materials are inorganic materials. Examples of useful fillers for this invention include: metal carbonates (e.g., calcium carbonate (e.g., chalk, calcite, marl, travertine, marble and limestone), calcium magnesium carbonate, sodium carbonate, magnesium carbonate), silica (e.g., quartz, glass beads, glass bubbles and glass fibers) silicates (e.g., talc, clays, (montmorillonite) feldspar, mica, calcium silicate, calcium metasilicate, sodium aluminosilicate, sodium silicate) metal sulfates (e.g., calcium sulfate, barium sulfate, sodium sulfate, aluminum sodium sulfate, aluminum sulfate), gypsum, vermiculite, wood flour, aluminum trihydrate, carbon black, metal oxides (e.g., calcium oxide (lime), aluminum oxide, titanium dioxide), and metal sulfites (e.g., calcium sulfite).

In general, the addition of a grinding aid increases the useful life of the abrasive article. A grinding aid is a material that has a significant effect on the chemical and physical processes of abrading, which results in improved performance. Although not wanting to be bound by theory, it is believed that a grinding aid(s) will (a) decrease the friction between the abrasive particles and the workpiece being abraded, (b) prevent the abrasive particles from "capping" (i.e., prevent metal particles from becoming welded to the tops of the abrasive particles), or at least reduce the tendency of abrasive particles to cap, (c) decrease the interface temperature between the abrasive particles and the workpiece, or (d) decreases the grinding forces.

Grinding aids encompass a wide variety of different materials and can be inorganic or organic based. Examples of chemical groups of grinding aids include waxes, organic halide compounds, halide salts and metals and their alloys. The organic halide compounds will typically break down during abrading and release a halogen acid or a gaseous halide compound. Examples of such materials include chlorinated waxes like tetrachloronaphtalene, pentachloronaphthalene, and polyvinyl chloride. Examples of halide salts include sodium chloride, potassium cryolite, sodium cryolite, ammonium cryolite, potassium tetrafluoroborate, sodium tetrafluoroborate, silicon fluorides, potassium chloride, and magnesium chloride. Examples of metals include, tin, lead, bismuth, cobalt, antimony, cadmium, and iron titanium. Other miscellaneous grinding aids include sulfur, organic sulfur compounds, graphite, and metallic sulfides. It is also within the scope of the present invention to use a combination of different grinding aids, and in some instances this may produce a synergistic effect.

Grinding aids can be particularly useful in coated abrasive and bonded abrasive articles. In coated abrasive articles, grinding aid is typically used in the supersize coat, which is applied over the surface of the abrasive particles. Sometimes, however, the grinding aid is added to the size coat. Typically, the amount of grinding aid incorporated into coated abrasive articles are about 50–300 $g/m^2$ (desirably, about 80–160 $g/m^2$). In vitrified bonded abrasive articles grinding aid is typically impregnated into the pores of the article.

The abrasive articles can contain 100% abrasive particles according to the present invention, or blends of such abrasive particles with other abrasive particles and/or diluent particles. However, at least about 2% by weight, desirably at least about 5% by weight, and more desirably about 30–100% by weight, of the abrasive particles in the abrasive articles should be abrasive particles according to the present invention. In some instances, the abrasive particles according the present invention may be blended with another abrasive particles and/or diluent particles at a ratio between 5 to 75% by weight, about 25 to 75% by weight about 40 to 60% by weight, or about 50% to 50% by weight (i.e., in equal amounts by weight). Examples of suitable conventional abrasive particles include fused aluminum oxide (including white fused alumina, heat-treated aluminum oxide and brown aluminum oxide), silicon carbide, boron carbide, titanium carbide, diamond, cubic boron nitride, garnet, fused alumina-zirconia, and sol-gel-derived abrasive particles, and the like. The sol-gel-derived abrasive particles may be seeded or non-seeded. Likewise, the sol-gel-derived abrasive particles may be randomly shaped or have a shape associated with them, such as a rod or a triangle. Examples of sol gel abrasive particles include those described U.S. Pat. No. 4,314,827 (Leitheiser et al.), U.S. Pat. No. 4,518,397 (Leitheiser et al.), U.S. Pat. No. 4,623,364 (Cottringer et al.), U.S. Pat. No. 4,744,802 (Schwabel), U.S. Pat. No. 4,770,671 (Monroe et al.), U.S. Pat. No. 4,881,951 (Wood et al.), U.S. Pat. No. 5,011,508 (Wald et al.), U.S. Pat. No. 5,090,968 (Pellow), U.S. Pat. No. 5,139,978 (Wood), U.S. Pat. No. 5,201,916 (Berg et al.), U.S. Pat. No. 5,227,104 (Bauer), U.S. Pat. No. 5,366,523 (Rowenhorst et al.), U.S. Pat. No. 5,429,647 (Larmie), U.S. Pat. No. 5,498,269 (Larmie), and U.S. Pat. No. 5,551,963 (Larmie), the disclosures of which are incorporated herein by reference. Additional details concerning sintered alumina abrasive particles made by using alumina powders as a raw material source can also be found, for example, in U.S. Pat. No. 5,259,147 (Falz), U.S. Pat. No. 5,593,467 (Monroe), and U.S. Pat. No. 5,665,127 (Moltgen), the disclosures of which are incorporated herein by reference. Additional details concerning fused abrasive particles, can be found, for example, in U.S. Pat. No. 1,161,620 (Coulter), U.S. Pat. No. 1,192,709 (Tone), U.S. Pat. No. 1,247,337 (Saunders et al.), U.S. Pat. No. 1,268,533 (Allen), and U.S. Pat. No. 2,424,645 (Baumann et al.) U.S. Pat. No. 3,891,408 (Rowse et al.), U.S. Pat. No. 3,781,172 (Pett et al.), U.S. Pat. No. 3,893,826 (Quinan et al.), U.S. Pat. No. 4,126,429 (Watson), U.S. Pat. No. 4,457,767 (Poon et al.), U.S. Pat. No. 5,023,212 (Dubots et. al.), U.S. Pat. No. 5,143,522 (Gibson et al.), and U.S. Pat. No. 5,336,280 (Dubots et. al), and applications having U.S. Ser. Nos. 09/495,978, 09/496,422, 09/496,638, and 09/496,713, each filed on Feb. 2, 2000, and, Ser. Nos. 09/618,876, 09/618,879, 09/619,106, 09/619,191, 09/619,192, 09/619,215, 09/619, 289, 09/619,563, 09/619,729, 09/619,744, and 09/620,262, each filed on Jul. 19, 2000, Ser. No. 09/704,843, filed Nov. 2, 2000, and Ser. No. 09/772,730, filed Jan. 30, 2001, the disclosures of which are incorporated herein by reference. Additional details concerning ceramic abrasive particles, can be found, for example, in applications having U.S. Ser. Nos. 09/922,526, 09/922,527, 09/922,528, and 09/922,530, filed Aug. 2, 2001, now abandoned, Ser. Nos. 10/211,597, 10/211,638, 10/211,629, 10/211,598, 10/211,630, 10/211, 639, 10/211,034, 10/211,044, 10/211,628, 10/211,491, 10/211,640, and 10/211,684, each filed Aug. 2, 2002, and Ser. No. 10/358,910, 10/358,708, 10/358,765, and 10/358, 765, the disclosures of which are incorporated herein by reference. In some instances, blends of abrasive particles may result in an abrasive article that exhibits improved grinding performance in comparison with abrasive articles comprising 100% of either type of abrasive particle.

If there is a blend of abrasive particles, the abrasive particle types forming the blend may be of the same size. Alternatively, the abrasive particle types may be of different particle sizes. For example, the larger sized abrasive particles may be abrasive particles according to the present invention, with the smaller sized particles being another abrasive particle type. Conversely, for example, the smaller sized abrasive particles may be abrasive particles according to the present invention, with the larger sized particles being another abrasive particle type.

Examples of suitable diluent particles include marble, gypsum, flint, silica, iron oxide, aluminum silicate, glass (including glass bubbles and glass beads), alumina bubbles, alumina beads and diluent agglomerates. Abrasive particles according to the present invention can also be combined in or with abrasive agglomerates. Abrasive agglomerate particles typically comprise a plurality of abrasive particles, a binder, and optional additives. The binder may be organic and/or inorganic. Abrasive agglomerates may be randomly shape or have a predetermined shape associated with them. The shape may be a block, cylinder, pyramid, coin, square, or the like. Abrasive agglomerate particles typically have particle sizes ranging from about 100 to about 5000 micrometers, typically about 250 to about 2500 micrometers. Additional details regarding abrasive agglomerate particles may be found, for example, in U.S. Pat. No. 4,311,489 (Kressner), U.S. Pat. No. 4,652,275 (Bloecher et al.), U.S. Pat. No. 4,799,939 (Bloecher et al.), U.S. Pat. No. 5,549,962 (Holmes et al.), and U.S. Pat. No. 5,975,988 (Christianson), and applications having U.S. Ser. Nos. 09/688,444, 09/688, 484, 09/688,486, filed Oct. 16, 2000, and Ser. No. 09/971, 899, 09/972,315, and 09/972,316, filed Oct. 5, 2001, the disclosures of which are incorporated herein by reference.

The abrasive particles may be uniformly distributed in the abrasive article or concentrated in selected areas or portions of the abrasive article. For example, in a coated abrasive, there may be two layers of abrasive particles. The first layer comprises abrasive particles other than abrasive particles according to the present invention, and the second (outermost) layer comprises abrasive particles according to the present invention. Likewise in a bonded abrasive, there may be two distinct sections of the grinding wheel. The outermost section may comprise abrasive particles according to the present invention, whereas the innermost section does not. Alternatively, abrasive particles according to the present invention may be uniformly distributed throughout the bonded abrasive article.

Further details regarding coated abrasive articles can be found, for example, in U.S. Pat. No. 4,734,104 (Broberg), U.S. Pat. No. 4,737,163 (Larkey), U.S. Pat. No. 5,203,884 (Buchanan et al.), U.S. Pat. No. 5,152,917 (Pieper et al.), U.S. Pat. No. 5,378,251 (Culler et al.), U.S. Pat. No. 5,417,726 (Stout et al.), U.S. Pat. No. 5,436,063 (Follett et al.), U.S. Pat. No. 5,496,386 (Broberg et al.), U.S. Pat. No. 5,609,706 (Benedict et al.), U.S. Pat. No. 5,520,711 (Helmin), U.S. Pat. No. 5,954,844 (Law et al.), U.S. Pat. No. 5,961,674 (Gagliardi et al.), and U.S. Pat. No. 5,975,988 (Christianason), the disclosures of which are incorporated herein by reference. Further details regarding bonded abrasive articles can be found, for example, in U.S. Pat. No. 4,543,107 (Rue), U.S. Pat. No. 4,741,743 (Narayanan et al.), U.S. Pat. No. 4,800,685 (Haynes et al.), U.S. Pat. No. 4,898,597 (Hay et al.), U.S. Pat. No. 4,997,461 (Markhoff-Matheny et al.), U.S. Pat. No. 5,037,453 (Narayanan et al.), U.S. Pat. No. 5,110,332 (Narayanan et al.), and U.S. Pat. No. 5,863,308 (Qi et al.) the disclosures of which are incorporated herein by reference. Further details regarding vitreous bonded abrasives can be found, for example, in U.S. Pat. No. 4,543,107 (Rue), U.S. Pat. No. 4,898,597 (Hay et. al.), U.S. Pat. No. 4,997,461 (Markhoff-Matheny et al.), U.S. Pat. No. 5,094,672 (Giles Jr. et al.), U.S. Pat. No. 5,118,326 (Sheldon et al.), U.S. Pat. No. 5,131,926 (Sheldon et al.), U.S. Pat. No. 5,203,886 (Sheldon et al.), U.S. Pat. No. 5,282,875 (Wood et al.), U.S. Pat. No. 5,738,696 (Wu et al.), and U.S. Pat. No.

5,863,308 (Qi), the disclosures of which are incorporated herein by reference. Further details regarding nonwoven abrasive articles can be found, for example, in U.S. Pat. No. 2,958,593 (Hoover et al.), the disclosure of which is incorporated herein by reference.

The present invention provides a method of abrading a surface, the method comprising contacting at least one abrasive particle according to the present invention, with a surface of a workpiece; and moving at least of one the abrasive particle or the contacted surface to abrade at least a portion of said surface with the abrasive particle. Methods for abrading with abrasive particles according to the present invention range of snagging (i.e., high pressure high stock removal) to polishing (e.g., polishing medical implants with coated abrasive belts), wherein the latter is typically done with finer grades (e.g., ANSI 220 and finer) of abrasive particles. The abrasive particle may also be used in precision abrading applications, such as grinding cam shafts with vitrified bonded wheels. The size of the abrasive particles used for a particular abrading application will be apparent to those skilled in the art.

Abrading with abrasive particles according to the present invention may be done dry or wet. For wet abrading, the liquid may be introduced supplied in the form of a light mist to complete flood. Examples of commonly used liquids include: water, water-soluble oil, organic lubricant, and emulsions. The liquid may serve to reduce the heat associated with abrading and/or act as a lubricant. The liquid may contain minor amounts of additives such as bactericide, antifoaming agents, and the like.

Abrasive particles according to the present invention may be useful, for example, to abrade workpieces such as aluminum metal, carbon steels, mild steels, tool steels, stainless steel, hardened steel, titanium, glass, ceramics, wood, wood-like materials (e.g., plywood and particle board), paint, painted surfaces, organic coated surfaces and the like. The applied force during abrading typically ranges from about 1 to about 100 kilograms.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated. Unless otherwise stated, All examples contained no significant amount of $SiO_2$, $B_2O_3$, $P_2O_5$, $GeO_2$, $TeO_2$, $As_2O_3$, and $V_2O_5$.

EXAMPLES 1–16

A 250-ml polyethylene bottle (7.3-cm diameter) was charged with a 50-gram mixture of various powders (as specified for each example in Table 1 (below); using the raw material sources listed in Table 2, (below)), 75 grams of isopropyl alcohol, and 200 grams of alumina milling media (cylindrical in shape, both height and diameter of 0.635 cm; 99.9% alumina; obtained from Coors, Golden Colo.). The contents of the polyethylene bottle were milled for 16 hours at 60 revolutions per minute (rpm). After the milling, the milling media were removed and the slurry was poured onto a warm (about 75° C.) glass ("PYREX") pan in a layer, and allowed to dry and cool. Due to the relatively thin layer of material (i.e., about 3 mm thick) and the warm pan, the slurry formed a cake within 5 minutes, and dried in about 30 minutes. The dried material was ground by screening through a 70-mesh screen (212-micrometer opening size) with the aid of a paintbrush.

TABLE 1

| Example | Raw material amounts, g | Oxide equivalent* of the components, % by weight | Percent amorphous yield |
|---|---|---|---|
| 1 | $Al_2O_3$: 14.7<br>Al: 23.3<br>$La_2O_3$: 6.4<br>$Y_2O_3$: 2.8<br>MgO: 2.8 | $Al_2O_3$: 83<br><br>$La_2O_3$: 9<br>$Y_2O_3$: 4<br>MgO: 4 | 24 |
| 2 | $Al_2O_3$: 14.7<br>Al: 23.3<br>$La_2O_3$: 6.4<br>$Y_2O_3$: 5.7 | $Al_2O_3$: 83<br><br>$La_2O_3$: 9<br>$Y_2O_3$: 8 | 51 |
| 3 | $Al_2O_3$: 17.0<br>Al: 27.0<br>$La_2O_3$: 3.0<br>$Y_2O_3$: 3.0 | $Al_2O_3$: 92<br><br>$La_2O_3$: 4<br>$Y_2O_3$: 4 | 24 |
| 4 | $Al_2O_3$: 14.4<br>Al: 22.9<br>$La_2O_3$: 9.9<br>MgO: 2.8 | $Al_2O_3$: 82<br><br>$La_2O_3$: 14<br>MgO: 4 | 21 |
| 5 | $Al_2O_3$: 15.7<br>Al: 24.9<br>$La_2O_3$: 6.5<br>MgO: 2.9 | $Al_2O_3$: 87<br><br>$La_2O_3$: 9<br>MgO: 4 | 23 |
| 6 | $Al_2O_3$: 13.7<br>Al: 21.7<br>$La_2O_3$: 6.2<br>$Y_2O_3$: 2.8<br>MgO: 5.5 | $Al_2O_3$: 79<br><br>$La_2O_3$: 9<br>$Y_2O_3$: 4<br>MgO: 8 | 33 |
| 7 | $Al_2O_3$: 16.0<br>Al: 25.3<br>$La_2O_3$: 2.9<br>MgO: 5.8 | $Al_2O_3$: 88<br><br>$La_2O_3$: 4<br>MgO: 8 | 13 |
| 8 | $Al_2O_3$: 13.9<br>Al: 22.1<br>$La_2O_3$: 2.8<br>$Y_2O_3$: 5.6<br>MgO: 5.6 | $Al_2O_3$: 80<br><br>$La_2O_3$: 4<br>$Y_2O_3$: 8<br>MgO: 8 | 40 |
| 9 | $Al_2O_3$: 11.6<br>Al: 18.5<br>$La_2O_3$: 9.3<br>$Y_2O_3$: 5.3<br>MgO: 5.3 | $Al_2O_3$: 70<br><br>$La_2O_3$: 14<br>$Y_2O_3$: 8<br>MgO: 8 | 80 |
| 10 | $Al_2O_3$: 18.2<br>Al: 28.8<br>$La_2O_3$: 3.0 | $Al_2O_3$: 96<br><br>$La_2O_3$: 4 | 11 |
| 11 | $Al_2O_3$: 16.0<br>Al: 25.3<br>$La_2O_3$: 2.9<br>$Y_2O_3$: 5.8 | $Al_2O_3$: 88<br><br>$La_2O_3$: 4<br>$Y_2O_3$: 8 | 25 |
| 12 | $Al_2O_3$: 13.5<br>Al: 21.4<br>$La_2O_3$: 9.7<br>$Y_2O_3$: 2.8<br>MgO: 2.8 | $Al_2O_3$: 78<br><br>$La_2O_3$: 14<br>$Y_2O_3$: 4<br>MgO: 4 | 49 |
| 13 | $Al_2O_3$: 13.5<br>Al: 21.4<br>$La_2O_3$: 9.7<br>MgO: 5.5 | $Al_2O_3$: 78<br><br>$La_2O_3$: 14<br>MgO: 8 | 22 |
| 14 | $Al_2O_3$: 16.8<br>Al: 26.6<br>$La_2O_3$: 6.6 | $Al_2O_3$: 91<br><br>$La_2O_3$: 9 | 16 |
| 15 | $Al_2O_3$: 12.8<br>Al: 20.2<br>$La_2O_3$: 6.1<br>$Y_2O_3$: 5.4<br>MgO: 5.4 | $Al_2O_3$: 75<br><br>$La_2O_3$: 9<br>$Y_2O_3$: 8<br>MgO: 8 | 74 |
| 16 | $Al_2O_3$: 15.4<br>Al: 24.5<br>$La_2O_3$: 10.1 | $Al_2O_3$: 86<br><br>$La_2O_3$: 14 | 15 |

*i.e., the relative amount of oxide when the Al metal is converted to $Al_2O_3$

TABLE 2

| Raw Material | Source |
| --- | --- |
| Alumina ($Al_2O_3$) particles | Obtained from Alcoa Industrial Chemicals, Bauxite, AR, under the trade designation "A16SG", average particle size of 0.4 micrometer |
| Aluminum (Al) particles | Obtained from Alfa Aesar, Ward Hill, MA, -325 mesh particle size |
| Lanthanum oxide ($La_2O_3$) particles | Obtained from Molycorp Inc., Mountain Pass, CA and calcined at 700° C. for 6 hours prior to batch mixing |
| Yttrium oxide ($Y_2O_3$) particles | Obtained from H. C. Stark Newton, MA |
| Magnesium oxide (MgO) particles | Obtained from BDH Chemicals Ltd, Poole, England |
| Zirconia ($ZrO_2$) particles | Obtained from Zirconia Sales, Inc. of Marietta, GA under the trade designation "DK-2", average particle size of 2 micrometer |

The resulting screened particles were fed slowly (about 0.5 gram/minute) into a hydrogen/oxygen torch flame which melted the particles and carried them directly into a 19-liter (5-gallon) cylindrical container (30 centimeters (cm) diameter by 34 cm height) of continuously circulating, turbulent water (20° C.) to rapidly quench the molten droplets. The torch was a Bethlehem bench burner PM2D Model B obtained from Bethlehem Apparatus Co., Hellertown, Pa. Hydrogen and oxygen flow rates for the torch were as follows. For the inner ring, the hydrogen flow rate was 8 standard liters per minute (SLPM) and the oxygen flow rate was 3.5 SLPM. For the outer ring, the hydrogen flow rate was 23 SLPM and the oxygen flow rate was 12 SLPM. The angle at which the flame hit the water was about 45°, and the flame length, burner to water surface, was about 18 centimeters (cm). The resulting (quenched) beads were collected in a pan and dried at -110° C. in an electrically heated furnace till dried (about 30 minutes). The beads were spherical in shape and varied in size from a few micrometers up to about 250 micrometers, and were either transparent (i.e., amorphous) and/or opaque (i.e., crystalline), varying within a sample. Amorphous materials (including glassy materials) are typically predominantly transparent due to the lack of light scattering centers such as crystal boundaries, while the crystalline particles are opaque due to light scattering effects of the crystal boundaries. Until proven to be amorphous and glass by Differential Thermal Analysis (DTA), the transparent flame-formed beads were considered to be only amorphous.

A percent amorphous yield was calculated from the resulting flame-formed beads using a -100+120 mesh size fraction (i.e., the fraction collected between 150-micrometer opening size and 125-micrometer opening size screens). The measurements were done in the following manner. A single layer of beads was spread out upon a glass slide. The beads were observed using an optical microscope. Using the crosshairs in the optical microscope eyepiece as a guide, beads that lay horizontally coincident with crosshair along a straight line were counted either amorphous or crystalline depending on their optical clarity. A total of 500 beads were counted and a percent amorphous yield was determined by the amount of amorphous beads divided by total beads counted.

The phase composition (glass/amorphous/crystalline) was determined through Differential Thermal Analysis (DTA). The material was classified as amorphous if the corresponding DTA trace of the material contained an exothermic crystallization event ($T_x$). If the same trace also contained an endothermic event ($T_g$) at a temperature lower than $T_x$, it was considered to consist of a glass phase. If the DTA trace of the material contained no such events, it was considered to contain crystalline phases.

Differential thermal analysis (DTA) was conducted on beads of Example 9 using the following method. A DTA run was made (using an instrument obtained from Netzsch Instruments, Selb, Germany under the trade designation "NETZSCH STA 409 DTA/TGA") using a -140+170 mesh size fraction (i.e., the fraction collected between 105-micrometer opening size and 90-micrometer opening size screens). An amount of each screened sample was placed in a 100-microliter $Al_2O_3$ sample holder. Each sample was heated in static air at a rate of 10° C./minute from room temperature (about 25° C.) to 1100° C.

Figure 4:
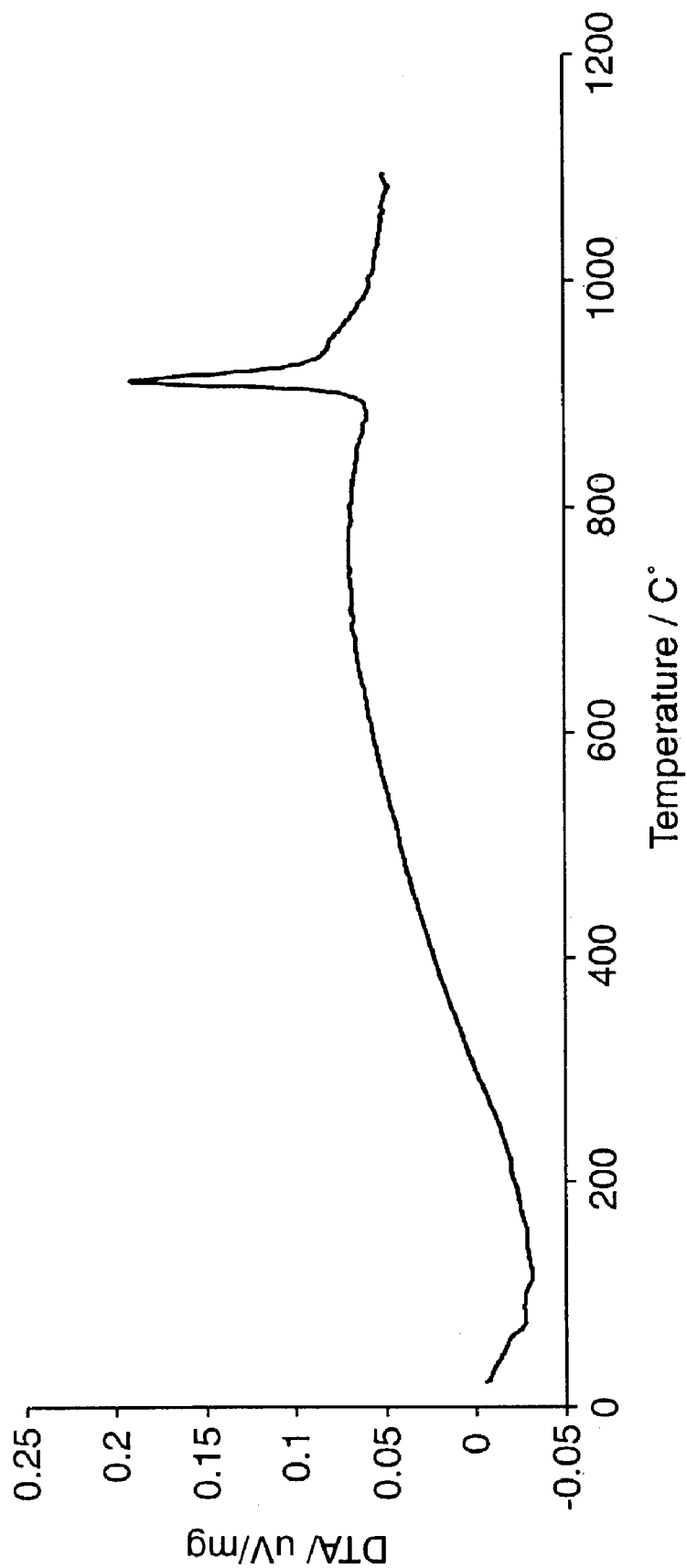
FIG. 4 is a DTA of material prepared in Example 12.

The DTA trace of the beads prepared in Example 12, shown in FIG. 4 exhibited an endothermic event at a temperature of about 876° C., as evidenced by a downward change in the curve of the trace. It is believed this event was due to the glass transition ($T_g$) of the glass material. The same material exhibited an exothermic event at a temperature of about 912° C., as evidenced by a sharp peak in the trace. It is believed that this event was due to the crystallization ($T_x$) of the material. Thus, the material was determined to be glass.

DTA was also conducted on Examples 2, 6, 8, 9, and 16 as described above for Example 12. The corresponding glass transition ($T_g$) and crystallization ($T_x$) temperatures are listed in Table 3, below.

TABLE 3

| Example | Glass transition temperature, $T_g$, ° C. | Glass crystallization temperature, $T_x$, ° C. | $T_x - T_g$ ° C. |
| --- | --- | --- | --- |
| 2 | 871 | 934 | 63 |
| 6 | 845 | 910 | 65 |
| 8 | 868 | 911 | 43 |
| 9 | 842 | 896 | 54 |
| 12 | 876 | 912 | 36 |
| 16 | 856 | 903 | 47 |

EXAMPLES 17–20

Example 17–20 beads were prepared as described above for Examples 1–16 except the amounts and sources of the raw material used are listed in Tables 4 (below) and 1 (above), respectively. A percent amorphous yield was calculated from the resulting flame-formed beads using the same method as that used for Examples 1–16. DTA was conducted as described above for Example 12. The percent amorphous yield data and glass transition ($T_g$) and crystallization ($T_x$) temperatures for Examples 17–20 are listed in Table 4, below.

TABLE 4

| Example | Raw material amounts, g | Oxide equivalent* of the Weight percent of components, % by weight | Percent amorphous yield | Glass transition temperature, $T_g$, °C. | Glass Crystallization temperature, $T_x$, °C. | $T_x - T_g$, °C. |
|---|---|---|---|---|---|---|
| Ex. 17 | $Al_2O_3$: 12.8<br>Al: 20.2<br>$La_2O_3$: 10.2<br>$Y_2O_3$: 6.8<br>MgO: 0.1 | $Al_2O_3$: 75<br><br>$La_2O_3$: 14.85<br>$Y_2O_3$: 10<br>MgO: 0.15 | 91 | 892 | 924 | 32 |
| 18 | $Al_2O_3$: 12.8<br>Al: 20.2<br>$La_2O_3$: 8.2<br>$Y_2O_3$: 5.4<br>$ZrO_2$: 3.4<br>MgO: 0.1 | $Al_2O_3$: 75<br><br>$La_2O_3$: 11.85<br>$Y_2O_3$: 8<br>$ZrO_2$: 5<br>MgO: 0.15 | 92 | 880 | 928 | 48 |
| 19 | $Al_2O_3$: 13.9<br>Al: 22.1<br>$La_2O_3$: 8.4<br>$Y_2O_3$: 5.6<br>MgO: 0.1 | $Al_2O_3$: 80<br><br>$La_2O_3$: 11.85<br>$Y_2O_3$: 8<br>MgO: 0.15 | 84 | 902 | 927 | 25 |
| 20 | $Al_2O_3$: 15.2<br>Al: 24.1<br>$La_2O_3$: 3.6<br>$Y_2O_3$: 7.2<br>MgO: 0.1 | $Al_2O_3$: 85<br><br>$La_2O_3$: 4.85<br>$Y_2O_3$: 10<br>MgO: 0.15 | 59 | 895 | 934 | 39 |

*i.e., the relative amount of oxide when the Al metal is converted to $Al_2O_3$

About 5 grams of the glass beads prepared in Examples 17–20 were crystallized by heat-treating at 1250° C. for 15 minutes in an electrically heated furnace. The heat-treated beads were opaque as observed using an optical microscope (prior to heat-treatment, the beads were transparent). The opacity of the heat-treated beads is believed to be a result of the crystallization of at least a portion of the glass. Glassy materials are typically predominantly transparent due to the lack of light scattering centers such as crystal boundaries, while the crystalline materials are opaque due to light scattering effects of the crystal boundaries.

The crystallized beads were mounted in mounting resin (obtained under the trade designation "TRANSOPTIC POWDER" from Buehler, Lake Bluff, Ill.) in a cylinder of resin about 2.5 cm in diameter and about 1.9 cm high. The mounted section was prepared using conventional polishing techniques using a polisher (obtained from Buehler, Lake Bluff, Ill. under the trade designation "ECOMET 3"). The sample was polished for about 3 minutes with a diamond wheel, followed by 5 minutes of polishing with each of 45, 30, 15, 9, 3, and 1-micrometer slurries. The microhardness measurements are made using a conventional microhardness tester (obtained under the trade designation "MITUTOYO MVK-VL" from Mitutoyo Corporation, Tokyo, Japan) fitted with a Vickers indenter using a 100-gram indent load. The microhardness measurements are made according to the guidelines stated in ASTM Test Method E384 Test Methods for Microhardness of Materials (1991), the disclosure of which is incorporated herein by reference. The average hardnesses for Examples 17, 19, and 20, based on an average of 10 measurements for each sample, are reported in Table 5, below.

TABLE 5

| Example | Average Hardness, GPa | Average Crystallite, nm |
|---|---|---|
| 17 | 20.3 | 119 |
| 19 | 20.1 | 128 |
| 20 | 18.7 | 172 |

Figure 5:
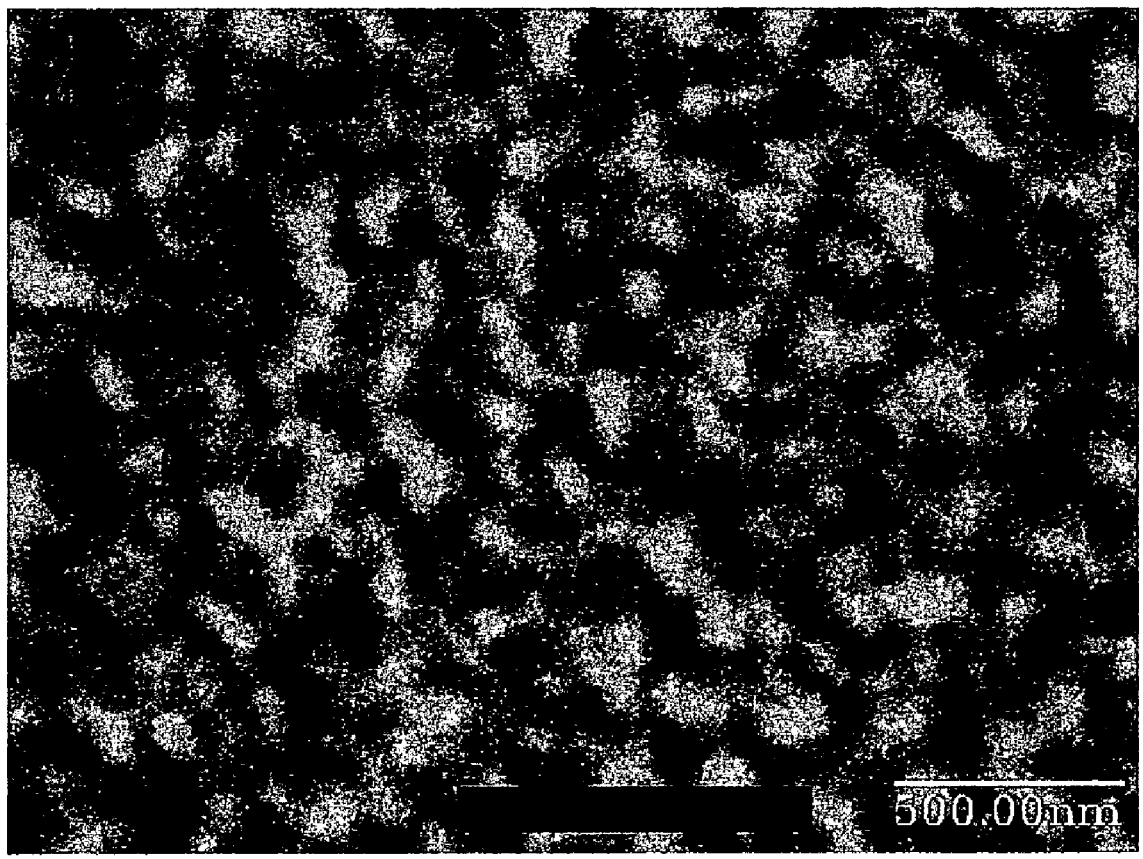
FIG. 5 is a back-scattered electron digital micrograph of a polished section of a material prepared in Example 17.

The mounted and polished sample used for the hardness measurement was sputtered with a thin layer of gold-palladium and viewed using a scanning electron microscopy (Model JSM 840A from JEOL, Peabody, Mass.). The average grain size was determined by the line intercept method according to the ASTM standard E 112-96 "Standard Test Methods for Determining Average Grain Size". A typical Back Scattered Electron (BSE) digital micrograph of the microstructure found in the sample was used to determine the average grain size as follows. The number of grains that intersected per unit length ($N_L$) of a random line were drawn across the digital micrograph was counted. The average crystallite size was then determined from this number using the following equation:

$$\text{Average Crystallite Size} = \frac{1.5}{N_L M}$$

Where $N_L$ is the number of crystallites intersected per unit length and M is the magnification of the digital micrograph. A BSE digital micrograph of Example 17 is shown in FIG. 5. The measured average crystallite size for each of Examples 17, 19, and 20 are listed in Table 5, above.

About 25 grams of the glass beads of Example 17 were placed in a separate graphite die and hot-pressed using a uniaxial pressing apparatus (obtained under the trade designation "HP-50", Thermal Technology Inc., Brea, Calif.).

The hot pressing was carried out in a nitrogen atmosphere and 74.2 megapascals (MPa) (10,700 pounds per square inch) pressure. The hot pressing furnace was ramped up to 970° C. at 25° C./minute. The resulting transparent disks, about 32 millimeters (mm) in diameter and 6 mm in thickness, were crushed by using a "Chipmunk" jaw crusher (Type VD, manufactured by BICO Inc., Burbank, Calif.) into particles and graded to retain the −30+35 fraction (i.e., the fraction collected between 600-micrometer opening size and 500-micrometer opening size screens) and the −35+40 mesh fraction (i.e., the fraction collected 500-micrometer opening size and 425-micrometer opening size screens).

The crush and graded particles were crystallized by heat-treating at 1200° C. for 20 minutes in an electrically heated furnace. The abrasive particles resulting from the heat-treatment were opaque as observed using an optical microscope (prior to heat-treatment, the particles were transparent). The opacity of the heat-treated abrasive particles is believed to be a result of the crystallization of at least a portion of the glass.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A plurality of abrasive particles having a specified nominal grade, wherein at least a portion of the plurality of abrasive particles are abrasive particles comprising at least 80 percent by weight of a glass-ceramic, based on the total weight of the respective abrasive particle, wherein the glass-ceramic comprises $Al_2O_3$, $La_2O_3$, $Y_2O_3$, and MgO, wherein at least 70 percent by weight of the glass-ceramic collectively comprises the $Al_2O_3$, $La_2O_3$, $Y_2O_3$, and MgO, based on the total weight of the glass-ceramic, and wherein at least 70 percent by weight of the collective weight of the $Al_2O_3$, $La_2O_3$, $Y_2O_3$, and MgO is $Al_2O_3$.

2. An abrasive article comprising a binder and a plurality of abrasive particles, wherein at least a portion of the abrasive particles are abrasive particles comprising at least 80 percent by weight of a glass-ceramic, based on the total weight of the respective abrasive particle, wherein the glass-ceramic comprises $Al_2O_3$, $La_2O_3$, $Y_2O_3$, and MgO, wherein at least 70 percent by weight of the glass-ceramic collectively comprises the $Al_2O_3$, $La_2O_3$, $Y_2O_3$, and MgO, based on the total weight of the glass-ceramic, and wherein at least 70 percent by weight of the collective weight of the $Al_2O_3$, $La_2O_3$, $Y_2O_3$, and MgO is $Al_2O_3$.

3. The abrasive article according to claim 2, wherein the abrasive article is a bonded abrasive article, a non-woven abrasive article, or a coated abrasive article.

4. Glass-ceramic comprising $Al_2O_3$, $La_2O_3$, $Y_2O_3$, and MgO, wherein the glass-ceramic (a) exhibits a microstructure comprising crystallites having an average crystallite size of less than 1 micrometer, and (b) is free of eutectic microstructure features, wherein at least a portion of the $Y_2O_3$ is present as a distinct crystalline phase.

5. Abrasive particles comprising the glass-ceramic according to claim 3.

6. Abrasive particle comprising at least 80 percent by weight of the glass-ceramic according to claim 4, based on the total weight of the abrasive particle.

7. A plurality of abrasive particles having a specified nominal grade, wherein at least a portion of the plurality of abrasive particles are abrasive particles according to claim 6.

8. An abrasive article comprising a binder and a plurality of abrasive particles, wherein at least a portion of the abrasive particles are the abrasive particles according to claim 6.

9. The abrasive article according to claim 8, wherein the abrasive article is a bonded abrasive article, a non-woven abrasive article, or a coated abrasive article.

10. Glass-ceramic comprising $Al_2O_3$, $La_2O_3$, $Y_2O_3$, and MgO wherein the glass-ceramic (a) exhibits a microstructure comprising crystallites having an average crystallite size of less than 200 nanometers and (b) has a density of at least 90% of theoretical density, wherein at least a portion of the $Y_2O_3$ is present as a distinct crystalline phase.

11. Abrasive particles comprising the glass-ceramic according to claim 10.

12. Abrasive particle comprising at least 80 percent by weight of the glass-ceramic according to claim 10, based on the total weight of the abrasive particle.

13. A plurality of abrasive particles having a specified nominal grade, wherein at least a portion of the plurality of abrasive particles are abrasive particles according to claim 12.

14. An abrasive article comprising a binder and a plurality of abrasive particles, wherein at least a portion of the abrasive particles are the abrasive particles according to claim 12.

15. The abrasive article according to claim 14, wherein the abrasive article is a bonded abrasive article, a non-woven abrasive article, or a coated abrasive article.

16. Glass-ceramic comprising $Al_2O_3$, $La_2O_3$, $Y_2O_3$, and MgO, wherein the glass-ceramic (a) exhibits a microstructure comprising crystallites, and wherein none of the crystallites are greater than 200 nanometers in size and (b) has a density of at least 90% of theoretical density, wherein at least a portion of the $Y_2O_3$ is present as a distinct crystalline phase.

17. Abrasive particles comprising the glass-ceramic according to claim 16

18. Abrasive particle comprising at least 80 percent by weight of the glass-ceramic according to claim 16, based on the total weight of the abrasive particle.

19. A plurality of abrasive particles having a specified nominal grade, wherein at least a portion of the plurality of abrasive particles are abrasive particles according to claim 18

20. An abrasive article comprising a binder and a plurality of abrasive particles, wherein at least a portion of the abrasive particles are the abrasive particles according to claim 18.

21. The abrasive article according to claim 20, wherein the abrasive article is a bonded abrasive article, a non-woven abrasive article, or a coated abrasive article.

22. Glass-ceramic comprising $Al_2O_3$, $La_2O_3$, $Y_2O_3$, and MgO, wherein the glass-ceramic (a) exhibits a microstructure comprising crystallites, and wherein at least a portion of the crystallites are not greater than 150 nanometers in size and (b) has a density of at least 90% of theoretical density, wherein at least a portion of the $Y_2O_3$ is present as a distinct crystalline phase.

23. Abrasive particles comprising the glass-ceramic according to claim 22.

24. Abrasive particle comprising at least 80 percent by weight of the glass-ceramic according to claim 22, based on the total weight of the abrasive particle.

25. A plurality of abrasive particles having a specified nominal grade, wherein at least a portion of the plurality of abrasive particles are abrasive particles according to claim 24.

26. An abrasive article comprising a binder and a plurality of abrasive particles, wherein at least a portion of the abrasive particles are the abrasive particles according to claim 24.

27. The abrasive article according to claim 26, wherein the abrasive article is a bonded abrasive article, a non-woven abrasive article, or a coated abrasive article.

28. Glass-ceramic comprising at least 75 percent by volume crystalline ceramic, the crystalline ceramic comprising $Al_2O_3$, $La_2O_3$, $Y_2O_3$, and MgO, wherein the glass-ceramic (a) exhibits a microstructure comprising crystallites having an average crystallite size of less than 200 nanometers and (b) has a density of at least 90% of theoretical density, wherein at least a portion of the $Y_2O_3$ is present as a distinct crystalline phase.

29. Abrasive particles comprising the glass-ceramic according to claim 28.

30. A plurality of abrasive particles having a specified nominal grade, wherein at least a portion of the plurality of abrasive particles are abrasive particles according to claim 29.

31. An abrasive article comprising a binder and a plurality of abrasive particles, wherein at least a portion of the abrasive particles are the abrasive particles according to claim 29.

32. The abrasive article according to claim 31 wherein the abrasive article is a bonded abrasive article, a non-woven abrasive article, or a coated abrasive article.

33. Glass-ceramic comprising at least 75 percent by volume crystalline ceramic, the crystalline ceramic comprising $Al_2O_3$, $La_2O_3$, $Y_2O_3$, and MgO, wherein the glass-ceramic (a) exhibits a microstructure comprising crystallites, and wherein none of the crystallites are greater than 200 nanometers in size and (b) has a density of at least 90% of theoretical density, wherein at least a portion of the $Y_2O_3$ is present as a distinct crystalline phase.

34. Abrasive particles comprising the glass-ceramic according to claim 33.

35. A plurality of abrasive particles having a specified nominal grade, wherein at least a portion of the plurality of abrasive particles are abrasive particles according to claim 34.

36. An abrasive article comprising a binder and a plurality of abrasive particles, wherein at least a portion of the abrasive particles are the abrasive particles according to claim 34.

37. The abrasive article according to claim 36, wherein the abrasive article is a bonded abrasive article, a non-woven abrasive article, or a coated abrasive article.

38. Glass-ceramic comprising at least 75 percent by volume crystalline ceramic, the crystalline ceramic comprising $Al_2O_3$, $La_2O_3$, $Y_2O_3$, and MgO, wherein the glass-ceramic (a) exhibits a microstructure comprising crystallites, and wherein at least a portion of the crystallites are not greater than 150 nanometers in size and (b) has a density of at least 90% of theoretical density, wherein at least a portion of the $Y_2O_3$ is present as a distinct crystalline phase.

39. Abrasive particles comprising the glass-ceramic according to claim 38.

40. A plurality of abrasive particles having a specified nominal grade, wherein at least a portion of the plurality of abrasive particles are abrasive particles according to claim 39.

41. An abrasive article comprising a binder and a plurality of abrasive particles, wherein at least a portion of the abrasive particles are the abrasive particles according to claim 39.

42. The abrasive article according to claim 41, wherein the abrasive article is a bonded abrasive article, a non-woven abrasive article, or a coated abrasive article.

43. Glass-ceramic comprising at least 75 percent by volume crystalline ceramic, the crystalline ceramic comprising $Al_2O_3$, $La_2O_3$, $Y_2O_3$, and MgO, wherein the glass-ceramic (a) exhibits a microstructure comprising crystallites having an average crystallite size not greater than 200 nanometer in size and (b) has a density of at least 90% of theoretical density, wherein at least a portion of the $Y_2O_3$ is present as a distinct crystalline phase.

44. Abrasive particles comprising the glass-ceramic according to claim 43.

45. A plurality of abrasive particles having a specified nominal grade, wherein at least a portion of the plurality of abrasive particles are abrasive particles according to claim 44.

46. An abrasive article comprising a binder and a plurality of abrasive particles, wherein at least a portion of the abrasive particles are the abrasive particles according to claim 44.

47. The abrasive article according to claim 46, wherein the abrasive article is a bonded abrasive article, a non-woven abrasive article, or a coated abrasive article.

* * * * *

UNITED STATES PATENT AND TRADEMARK OFFICE
CERTIFICATE OF CORRECTION

PATENT NO. : 7,258,707 B2  
APPLICATION NO. : 10/358855  
DATED : August 21, 2007  
INVENTOR(S) : Ahmet Celikkaya Page 1 of 2

It is certified that error appears in the above-identified patent and that said Letters Patent is hereby corrected as shown below:

Title Page, Item (54) Title, and Column 1, under (Title)
Line 1, delete "$AI_2O_3$-$LA_2O_3$-$Y_2O_3$-MGO" and insert
-- $Al_2O_3$-$LA_2O_3$-$Y_2O_3$-MGO --, therefor.

Column 5
Line 53, delete "$AI_2O_3$-metal" and insert -- $Al_2O_3$-metal --, therefor.

Column 9
Line 60, after "oxides" delete "are".

Column 13
Line 7, delete "et. al.," and insert -- et al., --, therefor.

Column 15
Line 19, delete "endotherinic" and insert -- endothermic --, therefor.

Column 18
Line 1, delete "for," and insert -- for --, therefor.

Column 21
Line 12, delete "Also" and insert -- also --, therefor.

Column 26
Line 33, delete "tetrachloronaphtalene," and insert -- tetrachloronaphthalene, --, therefor.

Column 27
Line 34, delete "(Dubots et. al.)," and insert -- (Dubots et al.), --, therefor.
Line 36, delete "(Dubots et. al.)," and insert -- (Dubots et al.), --, therefor.
Line 51, delete "10/358,765," and insert -- 10/358,772, --, therefor.

UNITED STATES PATENT AND TRADEMARK OFFICE
CERTIFICATE OF CORRECTION

PATENT NO. : 7,258,707 B2
APPLICATION NO. : 10/358855
DATED : August 21, 2007
INVENTOR(S) : Ahmet Celikkaya It is certified that error appears in the above-identified patent and that said Letters Patent is hereby corrected as shown below:

Column 28
Line 51, delete "(Christianason)," and insert -- (Christianson), --, therefor.

Column 29
Line 45, delete "All" and insert -- all --, therefor.

Column 36
Line 9, in Claim 10, after "MgO" insert -- , --.
Line 39, in Claim 19, after "claim 18" insert -- . --.
Line 47, in Claim 17, after "claim 16" insert -- . --.

Signed and Sealed this

Twenty-fourth Day of February, 2009

JOHN DOLL
*Acting Director of the United States Patent and Trademark Office*